United States Patent
Hashimoto et al.

(10) Patent No.: US 12,091,536 B2
(45) Date of Patent: Sep. 17, 2024

(54) RESIN COMPOSITION CONTAINING 4-METHYL-1-PENTENE COPOLYMER, AND FILM FOR CAPACITORS

(71) Applicant: MITSUI CHEMICALS, INC., Tokyo (JP)

(72) Inventors: Hisanori Hashimoto, Ichihara (JP); Masahiko Okamoto, Chiba (JP); Makoto Nakano, Chiba (JP); Toyoaki Sasaki, Narashino (JP); Masakazu Tanaka, Yokohama (JP)

(73) Assignee: Mitsui Chemicals, Inc. (JP)

( * ) Notice: Subject to any disclaimer, the term of this patent is extended or adjusted under 35 U.S.C. 154(b) by 699 days.

(21) Appl. No.: 17/297,587

(22) PCT Filed: Dec. 2, 2019

(86) PCT No.: PCT/JP2019/046939
§ 371 (c)(1),
(2) Date: May 27, 2021

(87) PCT Pub. No.: WO2020/116368
PCT Pub. Date: Jun. 11, 2020

(65) Prior Publication Data
US 2022/0041847 A1 Feb. 10, 2022

(30) Foreign Application Priority Data

Dec. 4, 2018 (JP) .................................. 2018-227480
Mar. 20, 2019 (JP) .................................. 2019-052757

(51) Int. Cl.
*C08L 23/20* (2006.01)
*H01G 4/18* (2006.01)
*H01G 4/32* (2006.01)

(52) U.S. Cl.
CPC ............... *C08L 23/20* (2013.01); *H01G 4/18* (2013.01); *H01G 4/32* (2013.01); *C08L 2201/08* (2013.01); *C08L 2201/10* (2013.01); *C08L 2203/16* (2013.01); *C08L 2203/20* (2013.01); *C08L 2205/025* (2013.01)

(58) Field of Classification Search
CPC ... C08L 23/20; C08L 2203/16; C08L 2203/20
See application file for complete search history.

(56) References Cited

U.S. PATENT DOCUMENTS

| 9,902,847 | B2 | 2/2018 | Tanaka et al. |
| 11,485,815 | B2 * | 11/2022 | Tanaka .................. C08F 210/14 |
| 2014/0342111 | A1 | 11/2014 | Tanaka et al. |
| 2015/0225623 | A1 * | 8/2015 | Akai ....................... C08L 23/10 |
| | | | 525/240 |
| 2015/0376306 | A1 * | 12/2015 | Tsurugi ............... C08F 4/65922 |
| | | | 502/103 |
| 2022/0041847 | A1 | 2/2022 | Hashimoto et al. |

FOREIGN PATENT DOCUMENTS

| JP | 2014-011182 A | 1/2014 | |
| JP | 2018-162408 A | 10/2018 | |
| JP | 7182644 B2 | 11/2022 | |
| WO | WO-2006054613 A1 * | 5/2006 | ............. C08F 10/00 |
| WO | WO-2010013467 A1 * | 2/2010 | ................ C08J 5/18 |
| WO | WO-2013/099876 A1 | 7/2013 | |

* cited by examiner

*Primary Examiner* — Michael M Dollinger
(74) *Attorney, Agent, or Firm* — Foley & Lardner LLP

(57) ABSTRACT

A resin composition including a 4-methyl-1-pentene copolymer (A) that satisfies particular requirements and a 4-methyl-1-pentene copolymer (B) that satisfies particular requirements, in which the content of the copolymer (A) is 10 to 95 parts by mass and the content of the copolymer (B) is 90 to 5 parts by mass with respect to 100 parts by mass of the total content of the copolymers (A) and (B).

17 Claims, No Drawings

RESIN COMPOSITION CONTAINING 4-METHYL-1-PENTENE COPOLYMER, AND FILM FOR CAPACITORS

CROSS-REFERENCE TO RELATED APPLICATIONS

The present application claims priority under 37 U.S.C. § 371 to International Patent Application No. PCT/JP2019/046939, filed Dec. 2, 2019, which claims priority to and the benefit of Japanese Patent Application Nos. 2018-227480, filed on Dec. 4, 2018, and 2019-052757, filed on Mar. 20, 2019. The contents of these applications are hereby incorporated by reference in their entireties.

TECHNICAL FIELD

The present invention relates to a resin composition containing a 4-methyl-1-pentene copolymer, and a film for capacitors.

BACKGROUND ART

4-Methyl-1-pentene polymers are superior to polyethylene and polypropylene in terms of properties such as heat resistance, transparency, and electrical properties, and are widely used in a variety of applications (see, for example, Patent Document 1). Specifically, a film for capacitors composed of a 4-methyl-1-pentene copolymer is known (see, for example, Patent Document 2).

CITATION LIST

Patent Documents

Patent Document 1: International Publication No. WO 2013/099876
Patent Document 2: Japanese Patent Laid-Open No. 2014-11182

SUMMARY OF INVENTION

Technical Problem

4-Methyl-1-pentene polymers generally have poor stretchability, which may limit the applications to which they can be applied compared to, for example, polyethylene and polypropylene, which are also polyolefins. An object according to the first mode of the present invention is to provide a resin composition containing a 4-methyl-1-pentene copolymer that can afford a molded article having excellent stretchability.

Also, in recent years, the demand for capacitors to further improve durability at a high temperature and under a long-term charge has become more stringent. An object according to the second mode of the present invention is to provide a film for capacitors, which is a film obtained by biaxial stretching, having high heat resistance enabling the maintenance of its quality even when used under a high temperature environment and having good dielectric loss properties at a high temperature.

Solution to Problem

The present inventors have conducted diligent research in order to solve the problems described above. As a result, the present inventors have found that the object according to the first mode described above can be attained by the following resin composition having a particular composition and that the object according to the second mode described above can be attained by the following film for capacitors, thereby completing the present invention.

The present invention relates to, for example, the following [1] to [18].

[1] A resin composition comprising a 4-methyl-1-pentene copolymer (A) that satisfies the following requirements (A-a) to (A-d) and a 4-methyl-1-pentene copolymer (B) that satisfies the following requirements (B-a) (B-a1), (B-b), (B-b1), and (B-c) to (B-d), wherein a content of the copolymer (A) is 10 to 95 parts by mass and a content of the copolymer (B) is 90 to 5 parts by mass with respect to 100 parts by mass of the total content of the copolymers (A) and (B):

(A-a) an amount (U1) of constitutional units derived from 4-methyl-1-pentene is 80.0 to 99.9% by mol and a total amount (U2) of constitutional units derived from at least one selected from linear α-olefins having 2 to 20 carbon atoms is 20.0 to 0.1% by mol (provided that U1 and U2 in total is 100% by mol);

(A-b) an intrinsic viscosity $[\eta]_A$ measured in decalin of 135° C. is 0.5 to 5.0 dL/g;

(A-c) when the copolymer (A) is measured in a cross fractionation chromatograph apparatus (CFC) using an infrared spectrophotometer as a detector part, at least one peak of an amount of a component eluted is present in a range of 100 to 140° C.;

(A-d) when the copolymer (A) is measured in the CFC, a molecular weight distribution (Mw/Mn), which is a ratio between a weight average molecular weight (Mw) and a number average molecular weight (Mn), in the component eluted in a range of 100 to 140° C. is 1.0 to 3.5;

(B-a) an amount (U3) of constitutional units derived from 4-methyl-1-pentene is 20.0 to 98.0% by mol and a total amount (U4) of constitutional units derived from at least one selected from linear α-olefins having 2 to 20 carbon atoms is 80.0 to 2.0% by mol (provided that U3 and U4 in total is 100% by mol);

(B-a1) a ratio (U4/U2) between U2 (% by mol) described in the requirement (A-a) and U4 (% by mol) described in the requirement (B-a) is more than 1.0 and less than 50.0;

(B-b) an intrinsic viscosity $[\eta]_B$ measured in decalin of 135° C. is 2.0 to 8.0 dL/g;

(B-b1) a ratio ($[\eta]_B/[\eta]_A$) between $[\eta]_A$ described in the requirement (A-b) and $[\eta]_B$ described in the requirement (B-b) is more than 1.0 and 6.0 or less;

(B-c) when the copolymer (B) is measured in a cross fractionation chromatograph apparatus (CFC) using an infrared spectrophotometer as a detector part, at least one peak of an amount of a component eluted is present in a range of 0° C. or higher and lower than 100° C.; and (B-d) when the copolymer (B) is measured in the CFC, a molecular weight distribution (Mw/Mn), which is a ratio between a weight average molecular weight (Mw) and a number average molecular weight (Mn), in the component eluted in a range of 0° C. or higher and lower than 100° C. is 1.0 to 7.0.

[2] The resin composition according to the [1], wherein the linear α-olefins in the copolymers (A) and (B) are each independently a linear α-olefin having 5 to 20 carbon atoms.

[3] The resin composition according to the [1] or [2], wherein the linear α-olefins in the copolymers (A) and (B) are each independently at least one selected from 1-hexene, 1-octene, 1-decene, 1-tetradecene, 1-hexadecene, and 1-octadecene.

[4] The resin composition according to any of the [1] to [3], wherein the content of the copolymer (A) is 15 to 90 parts by mass and the content of the copolymer (B) is 85 to 10 parts by mass with respect to 100 parts by mass of the total content of the copolymers (A) and (B).

[5] The resin composition according to any of the [1] to [4], wherein, when measured in a cross fractionation chromatograph (CFC) using an infrared spectrophotometer as a detector part, an amount of a component eluted in a range of 135° C. or higher is 20% by mass or less relative to the entire amount of a component eluted in a range of 0 to 145° C. of the resin composition.

[6] A molded article comprising the resin composition according to any of the [1] to [5].

[7] A film comprising the resin composition according to any of the [1] to [5].

[8] The film according to the [7], wherein the film is a film for capacitors.

[9] A film for capacitors, obtained by subjecting a film comprising a 4-methyl-1-pentene copolymer (C) that satisfies the following requirements (C-a) to (C-d) to biaxial stretching:

(C-a) an amount (U5) of constitutional units derived from 4-methyl-1-pentene is 20.0 to 98.0% by mol and an amount (U6) of constitutional units derived from an α-olefin having 5 to 20 carbon atoms other than 4-methyl-1-pentene is 80.0 to 2.0% by mol;

(C-b) an intrinsic viscosity $[\eta]_C$ measured in decalin of 135° C. is 1.5 to 8.0 dL/g;

(C-c) when the copolymer (C) is measured in a cross fractionation chromatograph apparatus (CFC) using an infrared spectrophotometer as a detector part, at least one peak of an amount of a component eluted is present in a range of 0° C. or higher and lower than 100° C.; and (C-d) when the copolymer (C) is measured in the CFC, a molecular weight distribution (Mw/Mn), which is a ratio between a weight average molecular weight (Mw) and a number average molecular weight (Mn), in the component eluted in a range of 0° C. or higher and lower than 100° C. is 1.0 to 7.0.

[10] A film for capacitors, obtained by subjecting a film composed of a composition (X) comprising 90 to 5 parts by mass of a 4-methyl-1-pentene copolymer (C) that satisfies the following requirements (C-a) to (C-d) and 10 to 95 parts by mass of a 4-methyl-1-pentene copolymer (D) that satisfies the following requirements (D-a) to (D-d) and (D-a1) (provided that the copolymer (C) and the copolymer (D) in total is 100 parts by mass) to biaxial stretching:

(C-a) an amount (U5) of constitutional units derived from 4-methyl-1-pentene is 20.0 to 98.0% by mol and an amount (U6) of constitutional units derived from an α-olefin having 5 to 20 carbon atoms other than 4-methyl-1-pentene is 80.0 to 2.0% by mol;

(C-b) an intrinsic viscosity $[\eta]_C$ measured in decalin of 135° C. is 1.5 to 8.0 dL/g;

(C-c) when the copolymer (C) is measured in a cross fractionation chromatograph apparatus (CFC) using an infrared spectrophotometer as a detector part, at least one peak of an amount of a component eluted is present in a range of 0° C. or higher and lower than 100° C.;

(C-d) when the copolymer (C) is measured in the CFC, a molecular weight distribution (Mw/Mn), which is a ratio between a weight average molecular weight (Mw) and a number average molecular weight (Mn), in the component eluted in a range of 0° C. or higher and lower than 100° C. is 1.0 to 7.0;

(D-a) an amount (U7) of constitutional units derived from 4-methyl-1-pentene is 80.0 to 99.9% by mol and an amount (U8) of constitutional units derived from an α-olefin having 2 to 20 carbon atoms other than 4-methyl-1-pentene is 20.0 to 0.1% by mol;

(D-b) an intrinsic viscosity $[\eta]_D$ measured in decalin of 135° C. is 0.5 to 5.0 dL/g;

(D-c) when the copolymer (D) is measured in a cross fractionation chromatograph apparatus (CFC) using an infrared spectrophotometer as a detector part, at least one peak of an amount of a component eluted is present in a range of 100° C. or higher and lower than 140° C.;

(D-d) when the copolymer (D) is measured in the CFC, a molecular weight distribution (Mw/Mn), which is a ratio between a weight average molecular weight (Mw) and a number average molecular weight (Mn), in the component eluted in a range of 100° C. or higher and lower than 140° C. is 1.0 to 3.5; and (D-a1) a ratio (U6/U8) between U6 (% by mol) described in the requirement (C-a) and U8 (% by mol) described in the requirement (D-a) is more than 1.0 and less than 50.0.

[11] The film for capacitors according to the [10], wherein the α-olefin in the copolymer (D) is an α-olefin having 5 to 20 carbon atoms other than 4-methyl-1-pentene.

[12] The film for capacitors according to the [10], wherein the α-olefins in the copolymers (C) and (D) are each independently an α-olefin having 10 to 20 carbon atoms.

[13] The film for capacitors according to any of the [9] to [12], having a ratio V (150° C.)/V (23° C.) between a dielectric breakdown strength at 23° C., V (23° C.), and a dielectric breakdown strength at 150° C., V (150° C.), of 0.50 or more.

[14] The film for capacitors according to any of the [9] to [13], having: a dielectric tangent at 23° C., tan δ (23° C.), of 400×10$^{-5}$ or less; a dielectric tangent at 150° C., tan δ (150° C.), of 50×10$^{-5}$ or less; and a ratio tan δ (150° C.)/tan δ (23° C.) between tan δ (23° C.) and tan δ (150° C.) of 0.10 or less.

[15] The film for capacitors according to any of the [9] to [14], having a stretching ratio of 1.1 to 100 times in terms of area.

[16] The film for capacitors according to any of the [9] to [15], having a thickness of 1 to 20 μm.

[17] A metallized film having the film for capacitors according to any of the [9] to [16] and a metal film provided on at least one face of the film.

[18] A film capacitor having the metallized film according to the [17].

Advantageous Effects of Invention

According to the first mode of the present invention, a resin composition containing a 4-methyl-1-pentene copolymer that can afford a molded article having excellent stretchability can be provided.

According to the second mode of the present invention, a film for capacitors, which is a film obtained by biaxial stretching, having high heat resistance enabling the maintenance of its quality even when used under a high temperature environment and having good dielectric loss properties at a high temperature can be provided.

DESCRIPTION OF EMBODIMENTS

Hereinafter, embodiments of the present invention will be described.

In the present specification, a numerical range of n1 to n2 means a numerical range of n1 or more and n2 or less in the case of n1<n2, and a numerical range of n2 or more and n1 or less in the case of n1>n2.

In the present specification, the term "capacitor" is used in the same meaning as an electrical condenser.

In the following description, various types of physical properties will be described, and details of the measurement conditions for each of the physical properties will be given in the Examples section.

[Resin Composition]

Hereinafter, the first mode of the present invention will be described.

A resin composition of the present embodiment contains a 4-methyl-1-pentene copolymer (A) and a 4-methyl-1-pentene copolymer (B), which will be described below.

<4-Methyl-1-pentene Copolymer (A)>

The 4-methyl-1-pentene copolymer (A) (hereinafter, this may also be referred to as the "copolymer (A)") has constitutional units derived from 4-methyl-1-pentene and constitutional units derived from a linear α-olefin having 2 to 20 carbon atoms, and satisfies the following requirements (A-a) to (A-d). It is preferable that the copolymer (A) should further satisfy the following requirement (A-e).

<<Requirement (A-a)>>

In the copolymer (A), the amount (U1) of constitutional units derived from 4-methyl-1-pentene is 80.0 to 99.9% by mol and the total amount (U2) of constitutional units derived from at least one selected from linear α-olefins having 2 to 20 carbon atoms is 20.0 to 0.1% by mol. U1 is preferably 85.0 to 99.9% by mol, and is more preferably 90.0 to 99.9% by mol. U2 is preferably 15.0 to 0.1% by mol, and is more preferably 10.0 to 0.1% by mol. Note that U1 and U2 in total is 100% by mol. This 100% by mol merely means U1 and U2 in total, and does not mean 100% by mol of the entire constitutional units constituting the copolymer (A).

Examples of the linear α-olefin having 2 to 20 carbon atoms include, for example, ethylene, propylene, 1-butene, 1-pentene, 1-hexene, 1-octene, 1-decene, 1-dodecene, 1-tetradecene, 1-hexadecene, 1-heptadecene, 1-octadecene, and 1-eicosene. In the present specification, ethylene shall be encompassed within α-olefins. Among these, from the viewpoint that the molded article obtained from the resin composition of the present embodiment can be stretched to a higher degree and can also maintain high transparency even after stretching, linear α-olefins having 5 to 20 carbon atoms are preferable, linear α-olefins having 6 to 20 carbon atoms are more preferable, and linear α-olefins having 10 to 20 carbon atoms are still more preferable. Specifically, 1-hexene, 1-octene, 1-decene, 1-tetradecene, 1-hexadecene, and 1-octadecene are preferable, and 1-decene, 1-tetradecene, 1-hexadecene, and 1-octadecene are particularly preferable.

The copolymer (A) may have only one kind of constitutional units derived from a linear α-olefin having 2 to 20 carbon atoms, or may have two or more kinds.

The copolymer (A) can further have constitutional units derived from another polymerizable compound other than 4-methyl-1-pentene and linear α-olefins having 2 to 20 carbon atoms, to the extent that the purpose of the present invention is not impaired. Examples of the other polymerizable compound include, for example, branched α-olefins having 20 or less carbon atoms other than 4-methyl-1-pentene; vinyl compounds having a cyclic structure such as styrene, vinylcyclopentene, vinylcyclohexane, and vinylnorbornane; vinyl esters such as vinyl acetate; unsaturated organic acids or derivatives thereof such as maleic anhydride; conjugated dienes such as butadiene, isoprene, pentadiene, and 2,3-dimethylbutadiene; and nonconjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylene norbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2, 2-norbornadiene.

In the copolymer (A), the content ratio of constitutional units derived from the other polymerizable compound is normally 10% by mol or less, preferably 5% by mol or less, and more preferably 3% by mol or less out of 100% by mol of the entire constitutional units constituting the copolymer (A).

When the copolymer (A) comprises two or more kinds of copolymers, the amount (U1) of constitutional units derived from 4-methyl-1-pentene and the total amount (U2) of constitutional units derived from a linear α-olefin having 2 to 20 carbon atoms in the requirement (A-a) can be the average value of the respective copolymers considering the mass ratio thereof. For example, when the copolymer (A) is composed of 30% by mass of a copolymer in which the amount of constitutional units derived from 4-methyl-1-pentene is 80% by mol and 70% by mass of a copolymer in which the amount of constitutional units derived from 4-methyl-1-pentene is 90% by mol, U1 can be calculated as follows: U1=80×0.30+90×0.70=87 (% by mol). It is preferable that the respective copolymers should have the amount of constitutional units derived from 4-methyl-1-pentene and the amount of constitutional units derived from a linear α-olefin having 2 to 20 carbon atoms, falling within the above numerical ranges of U1 and U2.

<<Requirement (A-b)>>

The copolymer (A) has an intrinsic viscosity $[\eta]_A$ of 0.5 to 5.0 dL/g measured in decalin of 135° C. The $[\eta]_A$ is preferably 0.5 to 4.5 dL/g, and is more preferably 0.5 to 4.0 dL/g.

The copolymer (A) having $[\eta]_A$ within the above range exhibits good flowability during preparation and molding of the resin composition, and is also thought to contribute to improved stretchability when combined with the 4-methyl-1-pentene copolymer (B).

When the copolymer (A) contains two or more kinds of copolymers, the intrinsic viscosity $[\eta]_A$ can be the average value of $[\eta]$ of the respective copolymers considering the mass ratio thereof. It is preferable that the respective copolymers should have $[\eta]$ falling within the above numerical range of $[\eta]_A$.

<<Requirement (A-c)>>

When the copolymer (A) is measured in a cross fractionation chromatograph apparatus (CFC) using an infrared spectrophotometer as a detector part, at least one peak of the amount of a component eluted is present in the range of 100 to 140° C. The peak of the amount of a component eluted is preferably present in the range of 100 to 135° C. Note that the position of the peak of the amount of a component eluted is determined based on the position of the peak top.

In one embodiment, it is preferable that the copolymer (A) should have no peak of the amount of a component eluted in the range of 0° C. or higher and lower than 100° C.

The copolymer (A) satisfying the requirement (A-c) contains a component with high crystallinity, and the molded article to be obtained tends to exhibit high heat resistance.

The content ratio of a component eluted at 135° C. or higher relative to the entire amount of a component eluted in a range of 0 to 145° C. of the copolymer (A) is preferably 30% by mass or less, more preferably 25% by mass or less, and still more preferably 20% by mass or less. The copolymer (A) satisfying this requirement is preferable from the viewpoint of uniform stretchability.

<<Requirement (A-d)>>

When the copolymer (A) is measured in a cross fractionation chromatograph apparatus (CFC) using an infrared spectrophotometer as a detector part, the molecular weight distribution (Mw/Mn), which is the ratio between the weight average molecular weight (Mw) and the number average molecular weight (Mn), in a component eluted in the range of 100 to 140° C. is 1.0 to 3.5. The Mw/Mn is preferably 1.0 to 3.0, and is more preferably 1.5 to 2.5. The respective average molecular weights described above are measured by the gel permeation chromatography (GPC) method, and are values in terms of polystyrene.

The resin composition including the copolymer (A) having Mw/Mn within the above range tends to have a low content of a relatively low molecular weight component, and is preferable from the viewpoint that the possibility of a decrease in the transparency of the molded article due to bleedout of the low molecular weight component and the possibility of the low molecular weight component weakening the crystal structure are reduced, which is thought to provide a favorable effect on the mechanical properties of the molded product.

The copolymer (A) having Mw/Mn within the above range can be obtained by, for example, using a metallocene catalyst, which will be mentioned later.

<<Requirement (A-e)>>

The copolymer (A) has a melting point (Tm) measured with a differential scanning calorimeter (DSC) of preferably 210 to 260° C., more preferably 220 to 260° C., and still more preferably 225 to 260° C.

The melting point tends to be dependent on the stereoregularity of the copolymer and the content ratio of constitutional units derived from a linear α-olefin having 2 to 20 carbon atoms. The melting point can be adjusted by using a metallocene catalyst, which will be mentioned later, and by controlling the content ratio of the constitutional units described above.

The copolymer (A) having a melting point within the above range is preferable from the viewpoint of heat resistance and moldability.

<4-Methyl-1-pentene Copolymer (B)>

The 4-methyl-1-pentene copolymer (B) (hereinafter, this may also be referred to as the "copolymer (B)") has constitutional units derived from 4-methyl-1-pentene and constitutional units derived from a linear α-olefin having 2 to 20 carbon atoms, and satisfies the following requirements (B-a), (B-a1), (B-b), (B-b1), and (B-c) to (B-d). It is preferable that the copolymer (B) should further satisfy the following requirement (B-e). It is preferable that the copolymer (B) should further satisfy the following requirement (B-f).

<<Requirement (B-a)>>

In the copolymer (B), the amount (U3) of constitutional units derived from 4-methyl-1-pentene is 20.0 to 98.0% by mol and the total amount (U4) of constitutional units derived from at least one selected from linear α-olefins having 2 to 20 carbon atoms is 80.0 to 2.0% by mol. U3 is preferably 20.0 to 97.0% by mol, and is more preferably 25.0 to 97.0% by mol. U4 is preferably 80.0 to 3.0% by mol, and is more preferably 75.0 to 3.0% by mol. Note that U3 and U4 in total is 100% by mol. This 100% by mol merely means U3 and U4 in total, and does not mean 100% by mol of the entire constitutional units constituting the copolymer (B).

Examples of the linear α-olefin having 2 to 20 carbon atoms include, for example, ethylene, propylene, 1-butene, 1-pentene, 1-hexene, 1-octene, 1-decene, 1-dodecene, 1-tetradecene, 1-hexadecene, 1-heptadecene, 1-octadecene, and 1-eicosene. Among these, from the viewpoint that the molded article obtained from the resin composition of the present embodiment can be stretched to a higher degree and can also maintain high transparency even after stretching, linear α-olefins having 5 to 20 carbon atoms are preferable, linear α-olefins having 6 to 20 carbon atoms are more preferable, and linear α-olefins having 10 to 20 carbon atoms are still more preferable. Specifically, 1-hexene, 1-octene, 1-decene, 1-tetradecene, 1-hexadecene, and 1-octadecene are preferable, and 1-decene, 1-tetradecene, 1-hexadecene, and 1-octadecene are particularly preferable.

The copolymer (B) may have only one kind of constitutional units derived from a linear α-olefin having 2 to 20 carbon atoms, or may have two or more kinds.

The copolymer (B) can further have constitutional units derived from another polymerizable compound, as mentioned above in the copolymer (A), to the extent that the purpose of the present invention is not impaired.

In the copolymer (B), the content ratio of constitutional units derived from the other polymerizable compound is normally 10% by mol or less, preferably 5% by mol or less, and more preferably 3% by mol or less out of 100% by mol of the entire constitutional units constituting the (B).

When the copolymer (B) contains two or more kinds of copolymers, the amount (U3) of constitutional units derived from 4-methyl-1-pentene and the total amount (U4) of constitutional units derived from a linear α-olefin having 2 to 20 carbon atoms in the requirement (B-a) can be the average value of the respective copolymers considering the mass ratio thereof. It is preferable that the respective copolymers should have the amount of constitutional units derived from 4-methyl-1-pentene and the amount of constitutional units derived from a linear α-olefin having 2 to 20 carbon atoms, falling within the above numerical ranges of U3 and U4.

In one embodiment, the copolymer (B) can contain a copolymer (B1) in which the total amount of constitutional units derived from at least one selected from linear α-olefins having 2 to 20 carbon atoms is 7.0% by mol or more and 80.0% by mol or less and a copolymer (B2) in which the total amount of constitutional units derived from at least one selected from linear α-olefins having 2 to 20 carbon atoms is 2.0% by mol or more and less than 7.0% by mol. Note that, in the respective copolymers (B1) and (B2), the amount of constitutional units derived from 4-methyl-1-pentene and the total amount of constitutional units derived from at least one selected from linear α-olefins having 2 to 20 carbon atoms in total is 100% by mol.

<<Requirement (B-a1)>>

The ratio (U4/U2) between U2 (% by mol) described in the requirement (A-a) and U4 (% by mol) described in the requirement (B-a) is more than 1.0 and less than 50.0. The ratio (U4/U2) is preferably 2.0 to 40.0, and is more preferably 3.0 to 35.0.

U2 is the total amount (% by mol) of constitutional units derived from at least one selected from linear α-olefins having 2 to 20 carbon atoms, when U1 and U2 in total described in the (A-a) is 100% by mol. U4 is the total amount (% by mol) of constitutional units derived from at least one selected from linear α-olefins having 2 to 20 carbon atoms, when U3 and U4 in total described in the (B-a) is 100% by mol.

The requirement (B-a1) means that the copolymer (B) contains a higher content ratio of constitutional units derived from the linear α-olefin, which is a comonomer to 4-methyl-1-pentene, compared to the copolymer (A). By using the copolymers (B) and (A) that satisfy the requirement (B-a1), the effect of improved stretchability tends to be obtained.

<<Requirement (B-b)>>

The copolymer (B) has an intrinsic viscosity $[\eta]_B$ of 2.0 to 8.0 dL/g measured in decalin of 135° C. The $[\eta]_B$ is preferably 2.5 to 7.5 dL/g, more preferably 2.7 to 7.0 dL/g, still more preferably 3.0 to 7.0 dL/g, and particularly preferably 3.5 to 7.0 dL/g. In one embodiment, the $[\eta]_B$ is preferably 2.0 to 7.0 dl/g, and is more preferably 2.5 to 6.5 dl/g.

The copolymer (B) having $[\eta]_B$ within the above range exhibits good flowability during preparation and molding of the resin composition, and is also thought to contribute to improved stretchability when combined with the 4-methyl-1-pentene copolymer (A). In particular, when the $[\eta]_B$ is the lower limit value described above or more, there is a tendency for the film to be obtained to have more excellent stretchability and more excellent rigidity.

When the copolymer (B) contains two or more kinds of copolymers, the intrinsic viscosity $[\eta]_B$ can be the average value of $[\eta]$ of the respective copolymers considering the mass ratio thereof. It is preferable that the respective copolymers should have $[\eta]$ falling within the above numerical range of $[\eta]_B$.

<<Requirement (B-b1)>>

The ratio ($[\eta]_B/[\eta]_A$) between $[\eta]_A$ described in the requirement (A-b) and $[\eta]_B$ described in the requirement (B-b) is more than 1.0 and 6.0 or less. The ratio ($[\eta]_B/[\eta]_A$) is preferably more than 1.0 and 5.0 or less, and is more preferably 1.1 to 4.0.

<<Requirement (B-c)>>

When the copolymer (B) is measured in a cross fractionation chromatograph apparatus (CFC) using an infrared spectrophotometer as a detector part, at least one peak of the amount of a component eluted is present in the range of 0° C. or higher and lower than 100° C. The peak of the amount of a component eluted is preferably present in the range of 0 to 80° C. Note that the position of the peak of the amount of a component eluted is determined based on the position of the peak top.

In one embodiment, it is preferable that the copolymer (B) should have no peak of the amount of a component eluted in the range of 100° C. to 140° C.

The copolymer (B) satisfying the requirement (B-c) contains a component with relatively low crystallinity compared to the copolymer (A), and the molded article to be obtained tends to exhibit high flexibility.

<<Requirement (B-d)>>

When the copolymer (B) is measured in a cross fractionation chromatograph apparatus (CFC) using an infrared spectrophotometer as a detector part, the molecular weight distribution (Mw/Mn), which is the ratio between the weight average molecular weight (Mw) and the number average molecular weight (Mn), in a component eluted in the range of 0° C. or higher and lower than 100° C. is 1.0 to 7.0. The Mw/Mn is preferably 1.0 to 6.5, and is more preferably 1.2 to 6.0. The respective average molecular weights described above are measured by the gel permeation chromatography (GPC) method, and are values in terms of polystyrene.

The resin composition including the copolymer (B) having Mw/Mn within the above range tends to have a low content of a relatively low molecular weight component, and is preferable from the viewpoint that the possibility of a decrease in the transparency of the molded article due to bleedout of the low molecular weight component and the possibility of the low molecular weight component weakening the crystal structure are reduced, which is thought to provide a favorable effect on the mechanical properties of the molded product.

The copolymer (B) having Mw/Mn within the above range can be obtained by, for example, using a metallocene catalyst, which will be mentioned later.

<<Requirement (B-e)>>

In one embodiment, when the copolymer (B) is measured in a cross fractionation chromatograph apparatus (CFC) using an infrared spectrophotometer as a detector part, the number average molecular weight (Mn) of a component eluted at 0° C. is 5000 or more, or no component eluted at 0° C. is present.

The copolymer (B) containing a component eluted at 0° C. in the CFC contains a component with very low crystallinity (or completely amorphous). The copolymer (B) in which the Mn of a component eluted at 0° C. is 5000 or more is normally a high comonomer containing body with very low crystallinity. Such a polymer has low crystallinity but a high molecular weight, which is preferable from the viewpoint that it is thought to be less likely to cause a decrease in transparency of the molded article due to bleedout of a low molecular weight component or cause roll staining during film molding. In copolymers polymerized using a metallocene catalyst, there is a tendency that the Mn of a component eluted at 0° C. is large or that no component eluted at 0° C. is present.

In the copolymer (B), the Mn of a component eluted at 0° C. is preferably 15000 or more, and is more preferably 20000 or more. The upper limit of the Mn is not particularly limited, and may be, for example, one million. In one embodiment, the content ratio of a component eluted at 0° C. relative to the entire amount of a component eluted in a range of 0 to 145° C. of the copolymer (B) is 10% by mass or less or 20% by mass or less.

<<Requirement (B-f)>>

In the copolymer (B), preferably, the melting point (Tm) measured with a differential scanning calorimeter (DSC) is 220° C. or lower, or no peak indicating the melting point appears in the DSC measurement; more preferably, the melting point (Tm) is 210° C. or lower, or no peak indicating the melting point appears in the DSC measurement; and still more preferably, the melting point (Tm) is 100 to 200° C., or no peak indicating the melting point appears in the DSC measurement.

The copolymer (B) satisfying the requirement (B-f) is preferable from the viewpoint of stretchability.

<Amount Ratio of Copolymers (A) and (B)>

In the resin composition of the present embodiment, the content of the copolymer (A) is 10 to 95 parts by mass, preferably 15 to 90 parts by mass, and more preferably 20 to 85 parts by mass, and the content of the copolymer (B) is 90 to 5 parts by mass, preferably 85 to 10 parts by mass, and more preferably 80 to 15 parts by mass. Note that the contents of the copolymers (A) and (B) in total is 100 parts by mass.

The copolymers (A) and (B) are thought to have good compatibility. Due to the good compatibility, the molded article to be obtained tends to have excellent transparency. In addition, due to the good compatibility, the molded article to be obtained tends to have a good balance between rigidity and extensibility.

In the resin composition of the present embodiment, the total content ratio of the copolymers (A) and (B) is normally 50% by mass or more, preferably 60% by mass or more, and more preferably 70% by mass or more. The upper limit of the content ratio of the copolymers (A) and (B) can be 100% by mass of the resin composition. When the resin composition contains other components (for example, other polymer components and additives, which will be mentioned later), the upper limit described above is defined by the content ratio of the other components.

The resin composition of the present embodiment can contain one kind or two or more kinds of copolymers (A). Also, the resin composition of the present embodiment can contain one kind or two or more kinds of copolymers (B).

The copolymer (A) has a relatively low intrinsic viscosity [η] compared to the copolymer (B) and is also a rigid component. Since the resin composition of the present embodiment contains these copolymers (A) and (B), the molded article to be obtained from such a resin composition has excellent stretchability while maintaining the transparency and heat resistance derived from the 4-methyl-1-pentene copolymers. Accordingly, the resin composition of the present embodiment is suited for the production of films for capacitors that require heat resistance and stretchability.

<Method for Producing Copolymers (A) and (B)>

Both copolymers (A) and (B) can be obtained by polymerizing, for example, 4-methyl-1-pentene, a linear α-olefin having 2 to 20 carbon atoms, and, if necessary, another polymerizable compound as described above. By carrying out the polymerization in the presence of a metallocene catalyst, the copolymers (A) and (B) that satisfy each of the requirements described above can be suitably obtained.

Examples of the metallocene catalyst include, for example, metallocene catalysts described in International Publication No. WO 01/53369, International Publication No. WO 01/27124, Japanese Patent Laid-Open No. H3-193796, Japanese Patent Laid-Open No. H02-41303, International Publication No. WO 06/025540, or International Publication No. WO 2013/099876.

Examples of the metallocene catalyst include, for example, a catalyst at least constituted from:

a metallocene compound (a); and a carrier (b).

<<Metallocene Compound (a)>>

A metallocene compound (a) is represented by, for example, a general formula (1) or (2).

[Chem. 1]

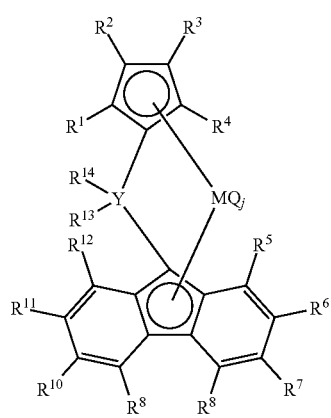

(1)

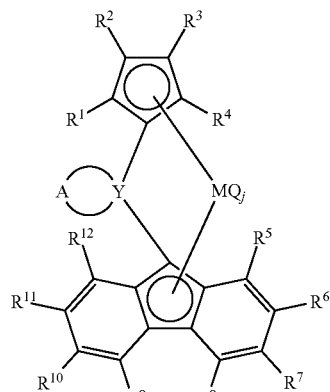

(2)

The meaning of each symbol in the general formula (1) or (2) is as follows.

$R^1$ to $R^{14}$ are each independently a hydrogen atom, a hydrocarbon group, a substituted hydrocarbon group, or a silicon containing group. The adjacent substituents $R^1$ to $R^4$ may be bonded to each other to form a ring. The adjacent substituents $R^5$ to $R^{12}$ may be bonded to each other to form a ring.

Y is a carbon atom or a silicon atom.

A is a divalent hydrocarbon group having 2 to 20 carbon atoms that may include an unsaturated bond and/or an aromatic ring. A may contain two or more ring structures, including the ring formed together with Y.

M is a metal (transition metal) selected from Group 4 of the periodic table, and examples thereof include, for example, titanium, zirconium, and hafnium.

Q is a halogen atom, a hydrocarbon group having 1 to 20 carbon atoms, an anion ligand, or a neutral ligand that is capable of being coordinated with a lone electron pair. When j is 2 or more, each Q may be the same as or different from each other.

j is an integer of 1 to 4, and is preferably 2.

Examples of the hydrocarbon group in $R^1$ to $R^{14}$ include, for example, hydrocarbon groups having 1 to 20 carbon atoms, and specific examples thereof include alkyl groups having 1 to 20 carbon atoms, cycloalkyl groups having 3 to 20 carbon atoms, arylalkyl groups having 7 to 20 carbon atoms, aryl groups having 6 to 20 carbon atoms, and alkylaryl groups having 7 to 20 carbon atoms.

The substituted hydrocarbon group in $R^1$ to $R^{14}$ (note that the silicon containing group is excluded) is a group in which a part of or all hydrogen atoms included in the hydrocarbon group are substituted with functional groups such as halogen atoms (fluorine, chlorine, bromine, or iodine), hydroxy groups and amino groups.

Examples of the silicon containing group in $R^1$ to $R^{14}$ include, for example, alkylsilyl groups or arylsilyl groups having 1 to 4 silicon atoms and 3 to 20 carbon atoms, and specific examples thereof include trimethylsilyl, tert-butyldimethylsilyl, and triphenylsilyl.

The adjacent substituents $R^5$ to $R^{12}$ on the fluorene ring may be bonded to each other to form a ring. Examples of such a substituted fluorenyl group include, for example, benzofluorenyl, dibenzofluorenyl, octahydrodibenzofluorenyl, and octamethyloctahydrodibenzofluorenyl.

It is preferable that the substituents $R^5$ to $R^{12}$ on the fluorene ring should be left-right symmetric, that is, $R^5=R^{12}$, $R^6=R^{11}$, $R^7=R^{10}$, and $R^8=R^9$, for ease of synthesis. The fluorene ring moiety is preferably unsubstituted fluorene, 3,6-disubstituted fluorene, 2,7-disubstituted fluorene, or 2,3,6,7-tetrasubstituted fluorene. Position 3, position 6, position 2, and position 7 on the fluorene ring correspond to $R^7$, $R^{10}$, $R^6$, and $R^{11}$, respectively.

It is preferable that $R^{13}$ and $R^{14}$ should be each independently a hydrogen atom, a hydrocarbon group, or a substituted hydrocarbon group.

In the case of general formula (1), $R^{13}$ and $R^{14}$ are bonded to Y and constitute a substituted methylene group or a substituted silylene group as the bridged part. Specific examples of the substituted methylene group and the substituted silylene group include, for example, dialkylmethylene, dicycloalkylmethylene, alkylcycloalkylmethylene, alkylarylmethylene, diarylmethylene, dialkylsilylene, dicycloalkylsilylene, alkylcycloalkylsilylene, alkylarylsilylene, diarylsilylene, and halogenated groups thereof.

In the case of general formula (2), Y is bonded to the divalent hydrocarbon group A described above to constitute a cycloalkylidene group, a cyclomethylenesilylene group, or the like. Specific examples of the cycloalkylidene group and the cyclomethylenesilylene group include, for example, cyclopropylidene, cyclobutylidene, cyclopentylidene, cyclohexylidene, cycloheptylidene, bicyclo[3.3.1]nonylidene, norbornylidene, adamantylidene, tetrahydronaphthylidene, dihydroindanylidene, cyclodimethylenesilylene, cyclotrimethylenesilylene, cyclotetramethylenesilylene, cyclopentamethylenesilylene, cyclohexamethylenesilylene, and cycloheptamethylenesilylene.

For Q, examples of the halogen atom include fluorine, chlorine, bromine, and iodine; examples of the hydrocarbon group having 1 to 20 carbon atoms include the same groups as the hydrocarbon groups of $R^1$ to $R^{14}$; examples of the anion ligand include an alkoxy group, an aryloxy group, a carboxylate group, a sulfonate group, and the like; and examples of the neutral ligand that is capable of being coordinated with a lone electron pair include organophosphorus compounds such as trimethylphosphine, triethylphosphine, triphenylphosphine, and diphenylmethylphosphine; ethers such as tetrahydrofuran, diethyl ether, dioxane, and 1,2-dimethoxyethane; and the like. It is preferable at least one of Q is a halogen atom or an alkyl group having 1 to 20 carbon atoms.

Specific examples of the metallocene compound (a) include, for example, compounds listed in International Publication No. WO 01/27124, International Publication WO 2006/025540, or International Publication WO 2007/308607.

The metallocene compound (a) is particularly preferably a compound represented by a general formula [A2], as described in International Publication No. WO 2014-050817 or the like.

[Chem. 2]

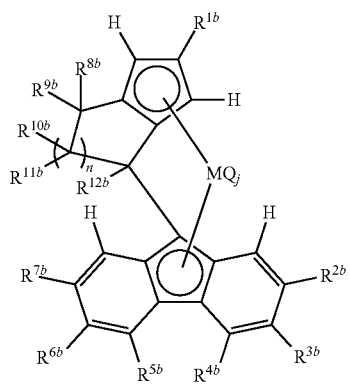

[A2]

In the formula [A2], Rib is a hydrocarbon group, a silicon containing group, or a halogen containing hydrocarbon group; $R^{2b}$ to $R^{12b}$ are each selected from a hydrogen atom, a hydrocarbon group, a silicon containing group, a halogen atom, and a halogen containing hydrocarbon group and may be the same as or different from each other, and the respective substituents may be bonded to each other to form a ring. M is a transition metal of Group 4 of the periodic table; n is an integer of 1 to 3; Q is as defined in Q in the general formula (1) or (2); and j is an integer of 1 to 4.

Examples of the hydrocarbon group in $R^{1b}$ to $R^{12b}$ include, for example, linear hydrocarbon groups such as a linear alkyl group and a linear alkenyl group; branched hydrocarbon groups such as a branched alkyl group; cyclic saturated hydrocarbon groups such as a cycloalkyl group, a norbornyl group, and an adamantyl group; cyclic unsaturated hydrocarbon groups such as an aryl group and a cycloalkenyl group; groups formed by replacing one or two or more hydrogen atoms that a saturated hydrocarbon group has with cyclic unsaturated hydrocarbon groups, such as an aralkyl group. The number of carbon atoms in the hydrocarbon group is normally 1 to 20, preferably 1 to 15, and more preferably 1 to 10.

Examples of the silicon containing group in $R^{1b}$ to $R^{12b}$ include, for example, groups represented by the formula: —$SiR_3$, wherein a plurality of R each independently represent an alkyl group having 1 to 15 carbon atoms or a phenyl group.

Examples of the halogen containing hydrocarbon group in $R^{1b}$ to $R^{12b}$ include, for example, groups formed by replacing one or two or more hydrogen atoms that the hydrocarbon group described above has with halogen atoms, such as a trifluoromethyl group.

Examples of the halogen atom in $R^{2b}$ to $R^{12b}$ include, for example, a fluorine atom, a chlorine atom, a bromine atom, and an iodine atom.

In the formula [A2], examples of the ring (spiro ring or additional ring) formed by two substituents bonded to each other include, for example, aliphatic rings and aromatic rings. Specific examples thereof include a cyclohexane ring, a benzene ring, a hydrogenated benzene ring, and a cyclopentene ring, and it is preferably a cyclohexane ring, a benzene ring, and a hydrogenated benzene ring. Also, such a ring structure may further have a substituent such as an alkyl group on the ring.

It is particularly preferable that $R^{1b}$ should be a substituent in which the carbon having a free valency (carbon bonded to the cyclopentadienyl ring) is a tertiary carbon. Specific examples of $R^{1b}$ include a tert-butyl group, a tert-pentyl group, a 1-methylcyclohexyl group, and a 1-adamantyl group.

The fluorene ring moiety is not particularly limited as long as the structure is obtained from a publicly known fluorene derivative, but $R^{4b}$ and $R^{5b}$ are each preferably a hydrogen atom from the viewpoint of molecular weight.

$R^{2b}$, $R^{3b}$, $R^{6b}$, and $R^{7b}$ are each preferably a hydrocarbon group having 1 to 20 carbon atoms. Alternatively, $R^{2b}$ and $R^{3b}$ may be bonded to each other to form a ring, and $R^{6b}$ and $R^{7b}$ may be bonded to each other to form a ring. Examples of such a substituted fluorenyl group include, for example, a benzofluorenyl group, a dibenzofluorenyl group, an octahydrodibenzofluorenyl group, a 1,1,4,4,7,7,10,10-octamethyl-2,3,4,7,8,9,10,12-octahydro-1H-dibenzo[b,h]fluorenyl group, a 1,1,3,3,6,6,8,8-octamethyl-2,3,6,7,8,10-hexahydro-1H-dicyclopenta[b,h]fluorenyl group, and a 1',1',3',6',8',8'-hexamethyl-1'H,8'H-dicyclopenta[b,h]fluorenyl group.

It is preferable that $R^{8b}$ should be a hydrogen atom. It is preferable that $R^{9b}$ should be an alkyl group having 2 or more carbon atoms. From the viewpoint of synthesis, it is also preferable that $R^{10b}$ and $R^{11b}$ each should be a hydrogen atom.

Alternatively, in the case of n=1, $R^{9b}$ and $R^{10b}$ are more preferably bonded to each other to form a ring. Particularly preferably, the ring is a 6-membered ring such as a cyclohexane ring. In this case, $R^{11b}$ is preferably a hydrogen atom.

It is preferable that $R^{12b}$ should be an alkyl group.

M is a transition metal of Group 4 of the periodic table, and for example, it is Ti, Zr, or Hf, preferably Zr or Hf, and particularly preferably Zr.

n is an integer of 1 to 3, is preferably 1 or 2, and is more preferably 1. It is preferable that n should be the value described above from the viewpoint of efficiently obtaining the polymer to be produced.

j is an integer of 1 to 4, and is preferably 2.

The compound represented by the general formula [A2] is particularly preferably (8-octamethylfluoren-12'-yl-(2-(adamantan-1-yl)-8-methyl-3,3b,4,5,6,7,7a,8-octahydrocyclopenta[a]indene))zirconium dichloride or (8-(2,3,6,7-tetramethylfluoren)-12'-yl-(2-(adamantan-1-yl)-8-methyl-3,3b,4,5,6,7,7a,8-octahydrocyclopenta[a]indene))zirconium dichloride. In this context, the octamethylfluorene refers to 1,1,4,4,7,7,10,10-octamethyl-2,3,4,7,8,9,10,12-octahydro-1H-dibenzo[b,h]fluorene.

<<Carrier (b)>>

The carrier (b) is preferably in the form of particles, and by immobilizing the metallocene compound (a) on the surface and inside thereof, the metallocene catalyst described above is formed. The catalyst in such a form is generally called a metallocene supported catalyst.

The carrier (b) is composed mainly of an organoaluminum compound (b-1), an organoboron compound (b-2) or an inorganic compound (b-3), or a complex of two or more selected therefrom.

Examples of the organoaluminum compound (b-1) include trialkyl aluminums such as trimethyl aluminum, triethyl aluminum, triisobutyl aluminum, and tri-n-octyl aluminum; dialkyl aluminum hydrides such as diisobutyl aluminum hydride; tricycloalkyl aluminums; and organoaluminum oxy compounds typified by aluminoxanes. Examples of the organoaluminum compound (b-1) can also include organoaluminum oxy compounds including a boron atom, aluminoxanes including halogen as listed in International Publication No. WO 2005/066191 and International Publication No. WO 2007/131010, and ionic aluminoxanes as listed in International Publication No. WO 2003/082879.

Examples of the organoboron compound (b-2) include, for example, trialkylammonium tetraarylborate, trialkylammonium tetra(halogenated aryl)borate, dioctadecylmethylammonium tetraarylborate, dioctadecylmethylammonium tetra(halogenated aryl)borate, N,N-dialkylanilinium tetraarylborate, and N,N-dialkylanilinium tetra(halogenated aryl)borate.

Examples of the inorganic compound (b-3) include, for example, porous oxides, inorganic halides, clays, clay minerals, and ion-exchange lamellar compounds. Examples of the porous oxide include, for example, oxides such as $SiO_2$, $Al_2O_3$, MgO, $ZrO_2$, $TiO_2$, $B_2O_3$, CaO, ZnO, BaO, and $ThO_2$, and complexes or mixtures comprising them. For example, natural or synthetic zeolites such as $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO can be listed. Examples of the inorganic halide include, for example, $MgCl_2$, $MgBr_2$, $MnCl_2$, and $MnBr_2$. The inorganic halide may be used as it is, or may be used after being crushed with a ball mill or a vibrating mill. Alternatively, the inorganic halide may be dissolved in a solvent such as an alcohol and then precipitated into fine particles, with a precipitating agent, for use.

The carrier (b) is preferably a carrier containing an aluminum atom from the viewpoint of high activity and further suppression in the amount of a solvent-soluble portion. The content of the aluminum atom in the carrier (b) is preferably 20% by mass or more, more preferably 20 to 60% by mass, still more preferably 30 to 50% by mass, and particularly preferably 35 to 47% by mass.

As such a carrier (b), a solid aluminoxane is suitably used, and for example, solid aluminoxanes disclosed in International Publication No. WO 2010/055652, International Publication No. WO 2013/146337, or International Publication No. WO 2014-123212 are particularly suitably used.

The term "solid" means that the aluminoxane substantially maintains a solid state in a reaction environment where the solid aluminoxane is used. More specifically, this term means that, for example, when an olefin polymerization solid catalyst component is prepared by contacting respective components constituting the olefin polymerization catalyst, the aluminoxane is in a solid state in an environment having a specific temperature and pressure in an inert hydrocarbon medium such as hexane or toluene for use in the reaction.

The solid aluminoxane preferably contains an aluminoxane having at least one kind of constitutional units selected from a constitutional unit represented by the following formula (1) and a constitutional unit represented by the following formula (2), more preferably contains an aluminoxane having a constitutional unit represented by the following formula (1), and still more preferably contains a polymethylaluminoxane composed only of a constitutional unit represented by the following formula (1).

[Chem. 3]

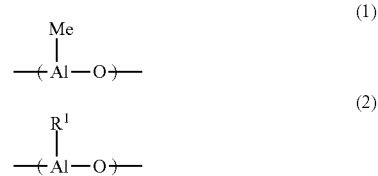

In the formula (1), Me represents a methyl group.

In the formula (2), $R^1$ is a hydrocarbon group having 2 to 20 carbon atoms, is preferably a hydrocarbon group having 2 to 15 carbon atoms, and is more preferably a hydrocarbon group having 2 to 10 carbon atoms. Examples of the hydrocarbon group include, for example, an alkyl group, a cycloalkyl group, and an aryl group.

The structure of the solid aluminoxane has not been completely revealed and is presumed to usually have a configuration with approximately 2 to 50 repeats of the constitutional units represented by the formula (1) and/or the formula (2), though not limited by the configuration. The binding pattern of the constitutional units varies and is, for example, a linear pattern, a cyclic pattern, or a clustered pattern. The aluminoxane is presumed to usually consist of one of these or be a mixture thereof. Alternatively, the aluminoxane may consist of the constitutional unit represented by the formula (1) or the formula (2).

The solid aluminoxane is preferably a solid polymethylaluminoxane, and is more preferably a solid polymethylaluminoxane composed only of the constitutional unit represented by the formula (1).

The solid aluminoxane functions as a catalyst carrier. Hence, in addition to the solid aluminoxane, there is no need to use, as a catalyst carrier, a solid inorganic carrier such as silica, alumina, silica-alumina, or magnesium chloride, or a solid organic carrier such as polystyrene beads.

The solid aluminoxane can be prepared by, for example, a method described in International Publication No. WO 2010/055652 and International Publication No. WO 2014/123212.

<<Organic Compound Component (c)>>

The metallocene catalyst may further contain an organic compound component (c), if necessary. The organic compound component (c) is used, if necessary, for the purpose of improving polymerization performance and the physical properties of the polymer to be produced. As the organic compound component (c), the organoaluminum compound (b-1) mentioned above may be used. Other examples thereof include alcohols, phenolic compounds, carboxylic acids, phosphorus compounds, amides, polyethers, and sulfonates.

<<Polymerization Conditions>>

The polymerization of 4-methyl-1-pentene and the linear α-olefin having 2 to 20 carbon atoms for obtaining the copolymers (A) and (B) can be performed by either liquid phase polymerization methods such as solution polymerization and suspension polymerization or gas phase polymerization methods. In the liquid phase polymerization methods, an inert hydrocarbon solvent can be used, and specific examples thereof include aliphatic hydrocarbons such as propane, butane, pentane, hexane, heptane, octane, decane, dodecane, and kerosene; alicyclic hydrocarbons such as cyclopentane, cyclohexane, methylcyclopentane, and methylcyclohexane; aromatic hydrocarbons such as benzene, toluene, and xylene; halogenated hydrocarbons such as ethylene chloride, chlorobenzene, dichloromethane, trichloromethane, and tetrachloromethane; and mixed solvents of two or more selected therefrom. Alternatively, the olefin itself, including 4-methyl-1-pentene, may be used as the polymerization solvent.

For the olefin polymerization, the method for using each component and the order of addition are arbitrarily selected. Examples thereof include methods as listed below. Hereinafter, the metallocene compound (a), the carrier (b), and the organic compound component (c) are also referred to as "components (a) to (c)", respectively.

(i) A method of adding the component (a) and the component (b) in an arbitrary order to a polymerization reactor.

(ii) A method of adding a catalyst component comprising the component (a) supported by the component (b) to a polymerization reactor.

In each of the methods (i) to (ii), the component (c) may be further added at an arbitrary stage. Also, at least two catalyst components may be contacted in advance.

In the solid catalyst component comprising the component (a) supported by the component (b), an olefin such as 4-methyl-1-pentene or 3-methyl-1-pentene may be prepolymerized. A catalyst component may be further supported on the prepolymerized solid catalyst component.

For polymerizing olefins using a metallocene catalyst, the amount of each component to be used that is capable of constituting the metallocene catalyst is as described below. In the metallocene catalyst, the content of each component can be adjusted as described below.

The component (a) is normally used in an amount of $10^{-10}$ to $10^{-2}$ mol, preferably $10^{-8}$ to $10^{-3}$ mol, per liter of reaction volume. The component (b-1) can be used in an amount of, in terms of the molar ratio [Al/M] between the aluminum atom in the component (b-1) and the entire transition metal atom (M) in the component (a), normally 10 to 10000, preferably 30 to 2000, and particularly preferably 150 to 500. The component (b-2) can be used in an amount of, in terms of the molar ratio [(b-2)/M] between the component (b-2) and the entire transition metal atom (M) in the component (a), normally 10 to 10000, preferably 30 to 2000, and still more preferably 150 to 500. The component (b-3) can be used in an amount of, in terms of the molar ratio [(b-3)/M] between the component (b-3) and the entire transition metal atom (M) in the component (a), normally 10 to 10000, preferably 30 to 2000, and still more preferably 150 to 500.

In the case of using the component (c), the component (c) can be used in an amount of normally 0.002 to 500, preferably 0.01 to 60, in terms of the molar ratio [Al/(c)] between the aluminum atom in the component (b-1) and the component (c) when the component (b) is the component (b-1), in an amount of normally 0.002 to 500, preferably 0.01 to 60, in terms of the molar ratio [(b-2)/(c)] between the component (b-2) and the component (c) when the component (b) is the component (b-2), and in an amount of normally 0.002 to 500, preferably 0.01 to 60, in terms of the molar ratio [(b-3)/(c)] between the component (b-3) and the component (c) when the component (b) is the component (b-3).

The polymerization temperature is normally −50 to 200° C., preferably 0 to 100° C., and more preferably 20 to 100° C. The polymerization pressure is under conditions of normally ordinary pressure to a gauge pressure of 10 MPa, and preferably ordinary pressure to a gauge pressure of 5 MPa. The polymerization reaction can be carried out by any of batch, semicontinuous, and continuous methods. Hydrogen can be added to the polymerization system for the purpose of controlling the molecular weight of the polymer to be produced or the polymerization activity, and an appropriate amount of hydrogen to be added is about 0.001 to 100 NL per kg of olefins.

As for the polymerization conditions, it is also possible to adopt multistage polymerization in which polymerization is carried out in two or more stages with different reaction conditions. For example, it is possible to obtain a polymer with the desired molecular weight distribution or composition distribution by performing stepwise polymerization under two kinds of conditions that differ in the amount of hydrogen to be used or in the ratio between 4-methyl-1-pentene and the linear α-olefin having 2 to 20 carbon atoms.

For example, the mixture of the copolymers (A) and (B) can be produced by the multistage polymerization method having the steps of: (1) producing the 4-methyl-1-pentene copolymer (A) by slurry polymerization; and (2) producing the 4-methyl-1-pentene copolymer (B) by slurry polymerization in the presence of the copolymer (A) obtained in step (1) such that the amount of the copolymer (B) falls within the range of 5 to 90 parts by mass with respect to 100 parts by mass of the total amount of the copolymers (A) and (B).

The above multistage polymerization method has step (1) and step (2) differing in polymerization conditions, but it may be two-stage polymerization of steps (1) and (2), or may be three-stage or higher polymerization comprising another step in addition to steps (1) and (2).

<<Step (1)>>

In step (1), the 4-methyl-1-pentene copolymer (A) is produced by slurry polymerization. In step (1), the ratio of the amounts of 4-methyl-1-pentene and the linear α-olefin having 2 to 20 carbon atoms to be supplied is set such that the respective amounts of constitutional units derived from them fall within the range mentioned above.

In step (1), a slurry comprising the copolymer (A) is obtained. The slurry concentration, that is, the copolymer (A) particle concentration, is normally 0.015 to 45% by mass, and is preferably 0.03 to 35% by mass.

<<Step (2)>>

In step (2), the 4-methyl-1-pentene copolymer (B) is produced by slurry polymerization in the presence of the copolymer (A) obtained in step (1). In step (2), the ratio of the amounts of 4-methyl-1-pentene and the linear α-olefin having 2 to 20 carbon atoms to be supplied is set such that the respective amounts of constitutional units derived from them fall within the range mentioned above.

In step (2), the copolymer (B) is produced such that the amount of the copolymer (B) falls within the range of 5 to 90 parts by mass with respect to 100 parts by mass of the total amount of the copolymer (A) obtained in step (1) and the copolymer (B) obtained in step (2).

In one embodiment, in step (2), to the slurry comprising the copolymer (A), 4-methyl-1-pentene and the linear α-olefin having 2 to 20 carbon atoms can be added to carry out slurry polymerization of these monomers.

In step (2), a slurry comprising particles containing the copolymer (A) and the copolymer (B) is obtained. The slurry concentration, that is, the particle concentration, is normally 3 to 50% by mass, and is preferably 5 to 40% by mass.

The above multistage polymerization method adopts slurry polymerization. The "slurry polymerization" refers to polymerization characterized by that a polymer resulting from polymerization is present without being substantially dissolved in the medium used in the polymerization, for example, in a form dispersed as fine particles in the medium.

<<Solid-Liquid Separation Step>>

By subjecting the slurry comprising 4-methyl-1-pentene polymer particles containing the copolymers (A) and (B) obtained in step (2) to solid-liquid separation, for example, by filtering the slurry, the particles can be separated and recovered.

<<Work-Up Step>>

For the 4-methyl-1-pentene polymer particles obtained by the multistage polymerization method, for example, for the particles obtained by the solid-liquid separation step, after production by the above method, if necessary, a publicly known work-up step such as a catalyst deactivation treatment step, a catalyst residue removal step, or a drying step may be carried out.

In the manner described above, the mixture of the copolymers (A) and (B) can be obtained.

<Other Polymer Components>

The resin composition of the present embodiment can further contain other polymer components other than the copolymers (A) and (B) mentioned above. Examples of the other polymer component include an α-olefin polymer (E) (note that the copolymers (A) and (B) mentioned above are excluded) and an elastomer other than them.

The α-olefin polymer (E) is, for example, a polymer of an α-olefin having 2 to 20 carbon atoms (note that the copolymers (A) and (B) mentioned above are excluded), and examples thereof include a homopolymer or copolymer of an α-olefin having 2 to 20 carbon atoms.

Examples of the α-olefin having 2 to 20 carbon atoms include, for example, linear α-olefins such as ethylene, propylene, 1-butene, 1-pentene, 1-hexene, 1-octene, 1-decene, 1-undecene, 1-dodecene, 1-tetradecene, 1-hexadecene, 1 octadecene, and 1-eicosene; and branched α-olefins such as isobutene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, and 3-ethyl-1-hexene. Among these, α-olefins having 15 or less carbon atoms are preferable, and α-olefins having 10 or less carbon atoms are more preferable.

The α-olefin polymer (E) can further have constitutional units derived from another polymerizable compound, as mentioned above in the copolymer (A), to the extent that the purpose of the present invention is not impaired.

In the α-olefin polymer (E), the content ratio of constitutional units derived from the other polymerizable compound is normally 10% by mol or less, preferably 5% by mol or less, and more preferably 3% by mol or less out of 100% by mol of the entire constitutional units constituting the (E).

Specific examples of the α-olefin polymer (E) include low density polyethylene; high density polyethylene; ethylene copolymers such as ethylene-propylene random copolymer, ethylene-1-butene random copolymer, ethylene-propylene-1-butene random copolymer, ethylene-1-hexene random copolymer, ethylene-1-octene random copolymer, ethylene-propylene-ethylidene norbornene random copolymer, ethylene-propylene-1-butene-ethylidene norbornene random copolymer, and ethylene-1-butene-1-octene random copolymer; propylene homopolymer; propylene copolymers such as propylene-1-butene random copolymer, propylene-1-hexene random copolymer, and propylene-1-octene random copolymer; 1-butene homopolymer; butene copolymers such as 1-butene-1-hexene random copolymer and 1-butene-1-octene random copolymer; 4-methyl-1-pentene homopolymer; and 4-methyl-1-pentene copolymers such as 4-methyl-1-pentene-1-hexene copolymer. Among these, a 4-methyl-1-pentene homopolymer and a 4-methyl-1-pentene copolymer are preferable from the viewpoint of compatibility.

The α-olefin polymer (E) has an intrinsic viscosity $[\eta]_E$ of normally 0.1 to 10 dL/g, preferably 0.5 to 5 dL/g, measured in decalin of 135° C.

In the α-olefin polymer (E), the melting point (Tm) measured with a differential scanning calorimeter (DSC) is not particularly limited, but it is preferably 60° C. or higher, and is more preferably 70 to 300° C., for reasons of heat resistance and strength.

The α-olefin polymer (E) can be produced by conventional, publicly known methods using, for example, a vanadium-based catalyst, a titanium-based catalyst, or a metallocene-based catalyst.

The resin composition of the present embodiment can contain one kind or two or more kinds of α-olefin polymers (E).

In the resin composition of the present embodiment, the content of the α-olefin polymer (E) is normally 50 parts by mass or less, and is preferably 40 parts by mass or less relative to 100 parts by mass of the contents of the copolymers (A) and (B) in total.

In one embodiment, when the resin composition of the present embodiment contains a large amount of 4-methyl-1-pentene homopolymer, the strength of the molded article to be obtained can be improved, but the stretchability may be poor. Hence, in the resin composition of the present embodiment, the content ratio of the 4-methyl-1-pentene homopolymer is preferably 30% by mass or less, more preferably 25% by mass or less, and still more preferably 20% by mass or less.

<Additives>

The resin composition of the present embodiment can contain conventional, publicly known additives.

Examples of the additive include, for example, secondary antioxidants, heat resistant stabilizers, weathering stabilizers, antistatic agents, slip agents, antiblocking agents, antifogging agents, lubricants, dyes, pigments, natural oils, synthetic oils, waxes, fillers, and hydrochloric acid absorbers. The content of the additive is not particularly limited, and it is normally 0 to 50 parts by mass, and is preferably 0 to 10 parts by mass relative to 100 parts by mass of the polymer component comprising the copolymers (A), (B), and the like.

The resin composition of the present embodiment can contain one kind or two or more kinds of additives.

[Method for Producing Resin Composition]

A method for producing the resin composition of the present embodiment will be described.

The resin composition of the present embodiment can be obtained by, for example, mixing the copolymers (A) and (B), and if necessary, other polymer components and/or additives. The mixture of the copolymers (A) and (B) may be obtained by the multistage polymerization method mentioned above.

As for the method for mixing each component, a variety of publicly known methods can be adopted, such as a method in which each component is mixed using an apparatus such as a plastomill, a Henschel mixer, a V-blender, a ribbon blender, a tumbler, a blender, a kneader ruder; and a method in which, after the mixing described above, the resulting mixture is further melt-kneaded in an apparatus such as a single-screw extruder, a twin-screw extruder, a kneader, a Banbury mixer, and then the resulting melt-kneaded product is granulated or pulverized.

When the resin composition of the present embodiment is measured in a cross fractionation chromatograph (CFC) using an infrared spectrophotometer as a detector part, the amount of a component eluted in the range of 135° C. or higher is preferably 20% by mass or less, more preferably 15% by mass or less, and still more preferably 10% by mass or less relative to the entire amount of a component eluted in a range of 0 to 145° C. of the resin composition, from the viewpoint of improving the stretchability of the molded article to be obtained and the like. Normally, the component eluted in the range of 135° C. or higher corresponds to the 4-methyl-1-pentene homopolymer.

[Molded Article]

A molded article of the present embodiment comprises the resin composition of the present embodiment, and is obtained by publicly known thermoforming methods, such as extrusion molding, injection molding, inflation molding, blow molding, extrusion blow molding, injection blow molding, press molding, stamping molding, vacuum molding, calendar molding, filament molding, foam molding, and powder slush molding.

The molded article of the present embodiment can be a molded article obtained by firstly obtaining a primary molded article by a method such as extrusion molding, injection molding, or solution casting, and then further processing it by a method such as blow molding or stretching.

In one embodiment, the molded article of the present embodiment is preferably a film. In addition to the conventional properties of 4-methyl-1-pentene copolymers such as heat resistance, mechanical physical properties, electrical properties (dielectric breakdown voltage and the like), and mold release properties, the film of the present embodiment has excellent stretchability and flexibility. The film of the present embodiment comprises the resin composition of the present embodiment, and can be obtained by, for example, melt-molding it normally in the range of 180 to 300° C. The thickness of the film of the present embodiment is normally 2 to 1000 μm, and is preferably 2 to 500 μm.

The film of the present embodiment can be, for example, not only a single layer film obtained from the resin composition of the present embodiment, but also a laminated film having a layer obtained from the resin composition of the present embodiment. Examples of the method for obtaining a laminated film include, for example, a method in which a surface layer film is obtained in advance by T-die molding or inflation molding and another layer is laminated onto the surface layer film by a publicly known lamination method such as extrusion lamination or extrusion coating; a method in which a plurality of films are independently molded and then each film is laminated by dry lamination; and a co-extrusion molding method in which a plurality of components are fed into a multilayer extruder and molded. The surface layer film described above is, for example, a layer obtained from the resin composition of the present embodiment.

Examples of the application of the film of the present embodiment include the following:

stretched films: for example, films for capacitors;

semiconductor process films: for example, dicing tapes, back grind tapes, die bonding films, and films for polarizing plates;

packaging films: for example, food packaging films, stretch films, wrap films, breathable films, shrink films, and easy peel films;

separators: for example, battery separators, separators for lithium ion batteries, electrolyte membranes for fuel cells, and pressure-sensitive adhesive or adhesive separators;

films for electronic components: for example, diffusion films, reflection films, radiation-resistant films, γ-ray resistant films, and porous films;

mold releasing films: for example, mold releasing films for flexible printed circuit boards, ACM substrates, rigid flexible substrates, advanced composite materials, carbon fiber composite material curing, glass fiber composite material curing, aramid fiber composite material curing, nanocomposite material curing, filler curing, urethane curing, epoxy curing, semiconductor encapsulation, polarizing plates, diffusion sheets, prism sheets, reflection sheets, fuel cells, and various rubber sheets;

surface protecting films: for example, protecting films for polarizing plates, liquid crystal panels, optical components, lenses, electric components or electric appliances, mobile phones, personal computers or touch panels, and masking films; and building material films: for example, window films for building materials, films for safety glass, bulletproof materials, films for bulletproof glass, heat shield sheets, and heat shield films.

The film of the present embodiment is preferably a stretched film, and for example, it is preferably a stretched film obtained by firstly molding the resin composition of the present embodiment by the T-die extrusion molding method or the like into a film-like or sheet-like primary molded article, and then further subjecting it to uniaxial or biaxial stretching. The stretching ratio in the MD direction and the TD direction can be each independently 2 to 20 times.

Examples of the specific application of stretched films include films for capacitors. For films for capacitors, film thinning by stretching and higher strength by orientation may be required. By using the resin composition of the present embodiment, a film with excellent thin film processability and high strength can be obtained. In addition, the film tends to be able to maintain its transparency even after stretching.

[Film for Capacitors]

Hereinafter, the second mode of the present invention will be described.

A film for capacitors of the present embodiment includes the second mode (1) obtained by subjecting a film comprising a 4-methyl-1-pentene copolymer (C), which will be described below, to biaxial stretching, and the second mode (2) obtained by subjecting a film composed of a composition (X) containing 4-methyl-1-pentene copolymers (C) and (D), which will be described below, to biaxial stretching.

In the present embodiment, the "film" is a generic name for planar molded articles, and also conceptually includes sheets, membranes, tapes, and the like.

The 4-methyl-1-pentene copolymers used in the present embodiment are excellent in film stretchability. In addition, the film for capacitors of the present embodiment has high heat resistance enabling the maintenance of its quality with a small decrease in the dielectric breakdown voltage even when used under a high temperature environment, has good dielectric loss properties at a high temperature, and thus has superior electrical properties for a long service life.

[Second Mode (1)]

A film for capacitors of the second mode (1) is obtained by subjecting a film comprising a 4-methyl-1-pentene copolymer (C) to biaxial stretching.

<4-Methyl-1-pentene Copolymer (C)>

The 4-methyl-1-pentene copolymer (C) (hereinafter, this may also be referred to as the "copolymer (C)") has constitutional units derived from 4-methyl-1-pentene and constitutional units derived from an α-olefin having 5 to 20 carbon atoms other than 4-methyl-1-pentene, and satisfies the following requirements (C-a) to (C-d).

The 4-methyl-1-pentene copolymer (C) may be one kind of 4-methyl-1-pentene copolymer that satisfies the following requirements (C-a) to (C-d), or may be two or more kinds of 4-methyl-1-pentene copolymers that satisfy the following requirements (C-a) to (C-d).

<<Requirement (C-a)>>

In the copolymer (C), the amount (U5) of constitutional units derived from 4-methyl-1-pentene is 20.0 to 98.0% by mol and the amount (U6) of constitutional units derived from an α-olefin having 5 to 20 carbon atoms other than 4-methyl-1-pentene is 80.0 to 2.0% by mol. U5 is preferably 20.0 to 97.0% by mol, and is more preferably 25.0 to 97.0% by mol. U6 is preferably 80.0 to 3.0% by mol, and is more preferably 75.0 to 3.0% by mol. Note that U5 and U6 in total is 100% by mol. This 100% by mol merely means U5 and U6 in total, and does not mean 100% by mol of the entire constitutional units constituting the copolymer (C).

When the amount of each constitutional unit is within the above range, the stretchability of the film is good, and as a result, the voltage withstand properties of the film tend to be improved, and for example, the decrease in dielectric breakdown voltage under a high temperature environment tends to be small.

When an α-olefin having 5 to 20 carbon atoms is used as a comonomer, there is a tendency that a film with excellent stretchability and voltage withstand properties is obtained. Examples of the α-olefin having 5 to 20 carbon atoms include, for example, 1-pentene, 1-hexene, 1-octene, 1-decene, 1-dodecene, 1-tetradecene, 1-hexadecene, 1-heptadecene, 1-octadecene, and 1-eicosene. Among these, from the viewpoint that the film to be obtained has more excellent stretchability, α-olefins having 6 to 20 carbon atoms are preferable, α-olefins having 10 to 20 carbon atoms are more preferable, and 1-decene, 1-tetradecene, 1-hexadecene, and 1-octadecene are still more preferable.

The copolymer (C) may have only one kind of constitutional units derived from an α-olefin having 5 to 20 carbon atoms other than 4-methyl-1-pentene, or may have two or more kinds.

The copolymer (C) can further have constitutional units derived from another polymerizable compound to the extent that the purpose of the present invention is not impaired. Examples of the other polymerizable compound include, for example, vinyl compounds having a cyclic structure such as styrene, vinylcyclopentene, vinylcyclohexane, and vinylnorbornane; vinyl esters such as vinyl acetate; unsaturated organic acids or derivatives thereof such as maleic anhydride; conjugated dienes such as butadiene, isoprene, pentadiene, and 2,3-dimethylbutadiene; and nonconjugated polyenes such as 1,4-hexadiene, 1,6-octadiene, 2-methyl-1,5-hexadiene, 6-methyl-1,5-heptadiene, 7-methyl-1,6-octadiene, dicyclopentadiene, cyclohexadiene, dicyclooctadiene, methylene norbornene, 5-vinylnorbornene, 5-ethylidene-2-norbornene, 5-methylene-2-norbornene, 5-isopropylidene-2-norbornene, 6-chloromethyl-5-isopropenyl-2-norbornene, 2,3-diisopropylidene-5-norbornene, 2-ethylidene-3-isopropylidene-5-norbornene, and 2-propenyl-2,2-norbornadiene.

In the copolymer (C), the content ratio of constitutional units derived from the other polymerizable compound is normally 10% by mol or less, preferably 5% by mol or less, and more preferably 3% by mol or less out of 100% by mol of the entire constitutional units constituting the (C).

<<Requirement (C-b)>>

The copolymer (C) has an intrinsic viscosity $[\eta]_C$ of 1.5 to 8.0 dL/g measured in decalin of 135° C. The $[\eta]_C$ is preferably 2.5 to 7.5 dL/g, more preferably 2.7 to 7.0 dL/g, still more preferably 3.0 to 7.0 dL/g, and particularly preferably 3.5 to 7.0 dL/g. In one embodiment, the $[\eta]_C$ is preferably 2.0 to 7.0 dL/g, and is more preferably 2.5 to 6.5 dL/g.

The copolymer (C) having $[\eta]_C$ within the above range exhibits good flowability during molding, and is also thought to contribute to improved stretchability when combined with a 4-methyl-1-pentene copolymer (D) in the second mode (2), which will be mentioned later. In particular, when $[\eta]_C$ is the lower limit value described above or more, there is a tendency for the film to be obtained to have more excellent stretchability and more excellent rigidity.

<<Requirement (C-c)>>

When the copolymer (C) is measured in a cross fractionation chromatograph apparatus (CFC) using an infrared spectrophotometer as a detector part, at least one peak of the amount of a component eluted is present in the range of 0° C. or higher and lower than 100° C. The peak of the amount of a component eluted is preferably present in the range of 0 to 80° C. Note that the position of the peak of the amount of a component eluted is determined based on the position of the peak top.

In one embodiment, it is preferable that the copolymer (C) should have no peak of the amount of a component eluted in the range of 100° C. or higher and lower than 140° C. In other words, the peak top of the amount of a component eluted described above is preferably not in the range of 100° C. or higher and lower than 140° C.

The copolymer (C) satisfying the requirement (C-c) comprises a component with relatively low crystallinity compared to a copolymer (D), which will be mentioned later, and the film to be obtained tends to exhibit high flexibility.

<<Requirement (C-d)>>

When the copolymer (C) is measured in a cross fractionation chromatograph apparatus (CFC) using an infrared spectrophotometer as a detector part, the molecular weight distribution (Mw/Mn), which is the ratio between the weight average molecular weight (Mw) and the number average molecular weight (Mn), in a component eluted in the range of 0° C. or higher and lower than 100° C. is 1.0 to 7.0. The Mw/Mn is preferably 1.0 to 6.5, and is more preferably 1.2 to 6.0. The respective average molecular weights described above are measured by the gel permeation chromatography (GPC) method, and are values in terms of polystyrene.

By using the copolymer (C) having Mw/Mn within the above range, the stretchability of the film is good, and as a result, the voltage withstand properties of the film tend to be improved. For example, the decrease in dielectric breakdown voltage under a high temperature environment tends to be small, and stable electrical properties required for a film for capacitors are easily expressed.

The copolymer (C) having Mw/Mn within the above range can be obtained by, for example, using a metallocene catalyst, which will be mentioned later.

<Other Components>

In the second mode (1), other polymer components can be used along with the copolymer (C). Specific examples of the other polymer component include an α-olefin polymer (E'), which will be mentioned later, and an elastomer other than them.

Also, in the second mode (1), conventional, publicly known additives can be used along with the copolymer (C). Examples of the additive include, for example, secondary antioxidants, heat resistant stabilizers, weathering stabilizers, antistatic agents, slip agents, antiblocking agents, antifogging agents, lubricants, dyes, pigments, natural oils, synthetic oils, waxes, fillers, and hydrochloric acid absorbers. The amount of each additive to be used is not particularly limited, and it is normally 0 to 50 parts by mass, and is preferably 0 to 10 parts by mass relative to 100 parts by mass of the copolymer (C).

[Second Mode (2)]

A film for capacitors of the second mode (2) is obtained by subjecting a film composed of a composition (X) containing 90 to 5 parts by mass of the 4-methyl-1-pentene copolymer (C) mentioned above and 10 to 95 parts by mass of a 4-methyl-1-pentene copolymer (D) that satisfies the following requirements (D-a) to (D-d) and (D-a1) (provided that the copolymer (C) and the copolymer (D) in total is 100 parts by mass) to biaxial stretching.

<4-Methyl-1-pentene Copolymer (D)>

The 4-methyl-1-pentene copolymer (D) (hereinafter, this may also be referred to as the "copolymer (D)") has constitutional units derived from 4-methyl-1-pentene and constitutional units derived from an α-olefin having 2 to 20 carbon atoms other than 4-methyl-1-pentene, and satisfies the following requirements (D-a) to (D-d) and (D-a1). It is preferable that the copolymer (D) should further satisfy the following requirement (D-b1).

The 4-methyl-1-pentene copolymer (D) may be one kind of 4-methyl-1-pentene copolymer that satisfies the following requirements (D-a) to (D-d) and (D-a1), or may be two or more kinds of 4-methyl-1-pentene copolymers that satisfy the following requirements (D-a) to (D-d) and (D-a1).

<<Requirement (D-a)>>

In the copolymer (D), the amount (U7) of constitutional units derived from 4-methyl-1-pentene is 80.0 to 99.9% by mol and the amount (U8) of constitutional units derived from an α-olefin having 2 to 20 carbon atoms other than 4-methyl-1-pentene is 20.0 to 0.1% by mol. U7 is preferably 85.0 to 99.9% by mol, and is more preferably 90.0 to 99.9% by mol. U8 is preferably 15.0 to 0.1% by mol, and is more preferably 10.0 to 0.1% by mol. Note that U7 and U8 in total is 100% by mol. This 100% by mol merely means U7 and U8 in total, and does not mean 100% by mol of the entire constitutional units constituting the copolymer (D).

When the amount of each constitutional unit is within the above range, the crystallinity of the film is high and the tensile modulus of the film is large. As a result, the voltage withstand properties of the film tend to be improved, and for example, the decrease in dielectric breakdown voltage under a high temperature environment tends to be small.

Examples of the α-olefin having 2 to 20 carbon atoms include, for example, ethylene, propylene, 1-butene, 1-pentene, 1-hexene, 1-octene, 1-decene, 1-dodecene, 1-tetradecene, 1-hexadecene, 1-heptadecene, 1-octadecene, and 1-eicosene. In the present specification, ethylene shall be encompassed within α-olefins. Among these, from the viewpoint that the film to be obtained has more excellent stretchability and voltage withstand properties, α-olefins having 5 to 20 carbon atoms are preferable, α-olefins having 6 to 20 carbon atoms are more preferable, α-olefins having 10 to 20 carbon atoms are still more preferable, and 1-decene, 1-tetradecene, 1-hexadecene, and 1-octadecene are particularly preferable.

The copolymer (D) may have only one kind of constitutional units derived from an α-olefin having 2 to 20 carbon atoms other than 4-methyl-1-pentene, or may have two or more kinds.

The copolymer (D) can further have constitutional units derived from another polymerizable compound other than 4-methyl-1-pentene and α-olefins having 2 to 20 carbon atoms, to the extent that the purpose of the present invention is not impaired. Specific examples of the other polymerizable compound are given in the description for the copolymer (C).

In the copolymer (D), the content ratio of constitutional units derived from the other polymerizable compound is normally 10% by mol or less, preferably 5% by mol or less, and more preferably 3% by mol or less out of 100% by mol of the entire constitutional units constituting the (D).

<<Requirement (D-b)>>

The copolymer (D) has an intrinsic viscosity $[\eta]_D$ of 0.5 to 5.0 dL/g measured in decalin of 135° C. The $[\eta]p$ is preferably 0.5 to 4.5 dL/g, and is more preferably 0.5 to 4.0 dL/g.

The copolymer (D) having $[\eta]_D$ within the above range exhibits good flowability during preparation and molding of the composition (X), and is also thought to contribute to improved stretchability when combined with the 4-methyl-1-pentene copolymer (C). As a result, the voltage withstand properties of the film tend to be improved.

<<Requirement (D-c)>>

When the copolymer (D) is measured in a cross fractionation chromatograph apparatus (CFC) using an infrared spectrophotometer as a detector part, at least one peak of the amount of a component eluted is present in the range of 100° C. or higher and lower than 140° C. The peak of the amount of a component eluted is preferably present in the range of 100 to 135° C. Note that the position of the peak of the amount of a component eluted is determined based on the position of the peak top.

In one embodiment, it is preferable that the copolymer (D) should have no peak of the amount of a component eluted in the range of 0° C. or higher and lower than 100° C. In other words, the peak top of the amount of a component eluted described above is preferably not in the range of 0° C. or higher and lower than 100° C.

The copolymer (D) satisfying the requirement (D-c) comprises a component with high crystallinity, and the film to be obtained tends to exhibit high heat resistance.

<<Requirement (D-d)>>

When the copolymer (D) is measured in a cross fractionation chromatograph apparatus (CFC) using an infrared spectrophotometer as a detector part, the molecular weight distribution (Mw/Mn), which is the ratio between the weight average molecular weight (Mw) and the number average molecular weight (Mn), in a component eluted in the range of 100° C. or higher and lower than 140° C. is 1.0 to 3.5. The Mw/Mn is preferably 1.0 to 3.0, and is more preferably 1.5 to 2.8. The respective average molecular weights described above are measured by the gel permeation chromatography (GPC) method, and are values in terms of polystyrene.

By using the copolymer (D) having Mw/Mn within the above range, the stretchability of the film is good, and as a result, the voltage withstand properties of the film tend to be improved. For example, the decrease in dielectric breakdown voltage under a high temperature environment tends to be small, and stable electrical properties required for a film for capacitors are easily expressed.

The copolymer (D) having Mw/Mn within the above range can be obtained by, for example, using a metallocene catalyst, which will be mentioned later.

<<Requirement (D-a1)>>

The ratio (U6/U8) between U6 (% by mol) described in the requirement (C-a) and U8 (% by mol) described in the requirement (D-a) is more than 1.0 and less than 50.0. The ratio (U6/U8) is preferably 2.0 to 40.0, and is more preferably 3.0 to 35.0.

U6 is the amount (% by mol) of constitutional units derived from the α-olefin having 5 to 20 carbon atoms other than 4-methyl-1-pentene, when U5 and U6 in total described in the (C-a) is 100% by mol. U8 is the amount (% by mol) of constitutional units derived from the α-olefin having 2 to 20 carbon atoms other than 4-methyl-1-pentene, when U7 and U8 in total described in the (D-a) is 100% by mol.

The requirement (D-a1) means that the copolymer (C) contains a higher content ratio of constitutional units derived from the α-olefin, which is a comonomer to 4-methyl-1-pentene, compared to the copolymer (D). By using the copolymers (C) and (D) that satisfy the requirement (D-a1), the effects of improved stretchability, a small decrease in dielectric breakdown voltage under a high temperature environment, and improved heat resistance tend to be obtained.

<<Requirement (D-b1)>>

The ratio ($[\eta]_C/[\eta]_D$) between $[\eta]_C$ described in the requirement (C-b) and $[\eta]_D$ described in the requirement (D-b) is preferably more than 1.0 and 6.0 or less, more preferably more than 1.0 and 5.0 or less, and still more preferably 1.1 to 4.0.

Since the composition (X) contains these copolymers (C) and (D), the film to be obtained from the composition (X) has excellent stretchability while maintaining the heat resistance derived from the 4-methyl-1-pentene copolymers. Accordingly, the composition (X) is suited for the production of films for capacitors that require heat resistance and stretchability. In one embodiment, the copolymer (D) has a relatively low intrinsic viscosity [η] compared to the copolymer (C) and is also a rigid component.

<Amount Ratio of Copolymers (C) and (D)>

In the composition (X), the content of the copolymer (C) is 90 to 5 parts by mass, preferably 90 to 15 parts by mass, and more preferably 85 to 20 parts by mass, and the content of the copolymer (D) is 10 to 95 parts by mass, preferably 10 to 85 parts by mass, and more preferably 15 to 80 parts by mass. Note that the copolymers (C) and (D) in total is 100 parts by mass. In such a mode, the stretchability of the film is good, and as a result, the voltage withstand properties of the film tend to be improved.

The copolymers (C) and (D) are thought to have good compatibility. Due to the good compatibility, the film to be obtained tends to have a good balance between rigidity and extensibility.

In the composition (X), the total content ratio of the copolymers (C) and (D) is normally 50% by mass or more, preferably 60% by mass or more, and more preferably 70% by mass or more. The upper limit of the content ratio of the copolymers (C) and (D) can be 100% by mass of the composition (X). When the composition (X) contains other components (for example, other polymer components and additives, which will be mentioned later), the upper limit described above is defined by the content ratio of the other components.

The composition (X) can contain one kind or two or more kinds of copolymers (C). Also, the composition (X) can contain one kind or two or more kinds of copolymers (D).

<Method for Producing Copolymers (C) and (D)>

Both copolymers (C) and (D) can be obtained by polymerizing, for example, 4-methyl-1-pentene, the α-olefin, and, if necessary, another polymerizable compound as described above. By carrying out the polymerization in the presence of a metallocene catalyst, the copolymers (C) and (D) that satisfy each of the requirements described above can be suitably obtained.

Examples of the metallocene catalyst include, for example, metallocene catalysts described in International Publication No. WO 01/53369, International Publication No. WO 01/27124, Japanese Patent Laid-Open No. 3-193796, Japanese Patent Laid-Open No. 02-41303, International Publication No. WO 06/025540, International Publication No. WO 2013/099876, and International Publication No. WO 2014/050817.

<<Metallocene Compound (a)>>

The metallocene catalyst comprises a metallocene compound (a).

Examples of the metallocene compound (a) include, for example, a compound represented by the general formula (1) or (2), and it is particularly preferably a compound represented by the general formula [A2].

<Co-Catalyst (b)>

It is preferable that the metallocene catalyst should further comprise at least one compound (co-catalyst (b)) selected from an organometallic compound (b-1), an organoaluminum oxy compound (b-2), and a compound (b-3) that reacts with the metallocene compound (a) to form the ion pair.

Examples of the organometallic compound (b-1) (note that the organoaluminum oxy compound (b-2) is excluded) include, for example, organoaluminum compounds, and specific examples thereof include organoaluminum compounds represented by the general formula: $R^a{}_m Al(OR^b)_n H_p X_q$, wherein $R^a$ and $R^b$ may be the same as or different from each other and are each a hydrocarbon group having 1 to 15, preferably 1 to 4 carbon atoms; X is a halogen atom;

and m is a number of 0<m≤3, n is a number of 0≤n<3, p is a number of 0≤p<3, q is a number of 0≤q<3, and m+n+p+q=3). Specific examples thereof include trialkylaluminums such as trimethylaluminum, triethylaluminum, triisobutylaluminum, and tri-n-octylaluminum; dialkylaluminum hydrides such as diisobutylaluminum hydride; and tricycloalkylaluminums such as tricyclohexylaluminum.

The organoaluminum oxy compound (b-2) may be a conventional, publicly known aluminoxane, or may be a benzene-insoluble organoaluminum oxy compound listed in Japanese Patent Laid-Open No. H2-78687. Specific examples thereof include methylaluminoxanes. Examples thereof also include organoaluminum oxy compounds including a boron atom, aluminoxanes including halogen as listed in International Publication No. WO 2005/066191 and International Publication No. WO 2007/131010, and ionic aluminoxanes as listed in International Publication No. WO 2003/082879.

As the aluminoxane, a solid aluminoxane is suitably used, and for example, solid aluminoxanes disclosed in International Publication No. WO 2010/055652, International Publication No. WO 2013/146337, or International Publication No. WO 2014-123212 are particularly suitably used. The details of the solid aluminoxane are as mentioned above, including the suitable modes.

The solid aluminoxane is usually in the form of particles having D50 of volume statistics of preferably 1 to 500 µm, more preferably 2 to 200 µm, further preferably 5 to 50 µm. The D50 of volume statistics can be determined by a laser diffraction/scattering method using, for example, MT3300EX II manufactured by MicrotracBEL Corp.

The specific surface area of the solid aluminoxane is preferably 100 to 1000 m$^2$/g, more preferably 300 to 800 m$^2$/g. The specific surface area can be determined through the use of the adsorption and desorption phenomena of a gas on solid surface according to a BET adsorption isotherm.

The solid aluminoxane also functions as a carrier (c). Hence, when the solid aluminoxane is used, there is no need to use a solid inorganic carrier such as silica, alumina, silica-alumina, or magnesium chloride, or a solid organic carrier such as polystyrene beads.

Examples of the compound (b-3) that reacts with the metallocene compound (a) to form the ion pair include, for example, Lewis acids, ionic compounds, borane compounds, and carborane compounds described in Japanese Patent Laid-Open No. H1-501950, Japanese Patent Laid-Open No. H1-502036, Japanese Patent Laid-Open No. H3-179005, Japanese Patent Laid-Open No. H3-179006, Japanese Patent Laid-Open No. H3-207703, Japanese Patent Laid-Open No. H3-207704, U.S. Pat. No. 5,321,106, and the like. Examples thereof can further include heteropoly compounds and isopoly compounds. For example, mention may be made of organoboron compounds such as trialkylammonium tetraarylborate, trialkylammonium tetra(halogenated aryl)borate, dioctadecylmethylammonium tetraarylborate, dioctadecylmethylammonium tetra(halogenated aryl)borate, N,N-dialkylanilinium tetraarylborate, and N,N-dialkylanilinium tetra(halogenated aryl)borate.

<Carrier (c)>

It is preferable that the metallocene catalyst should further comprise a carrier (c).

The carrier (c) is preferably in the form of particles, and for example, by immobilizing the metallocene compound (a) on the surface and/or inside thereof, the metallocene catalyst described above is formed.

The carrier (c) is normally composed of an inorganic or organic compound. Examples of the solid inorganic carrier include, for example, carriers composed of inorganic compounds such as porous oxides, inorganic halides, clays, clay minerals, and ion-exchange lamellar compounds. Examples of the solid organic carrier include, for example, carriers such as polystyrene beads.

Examples of the carrier (c) also include the solid aluminoxanes mentioned above. The carrier (c) is preferably a carrier containing an aluminum atom from the viewpoint of high activity and further suppression in the amount of a solvent-soluble portion. The content of the aluminum atom in the carrier (c) is preferably 20% by mass or more, more preferably 20 to 60% by mass, still more preferably 30 to 50% by mass, and particularly preferably 35 to 47% by mass.

Examples of the porous oxide include, for example, oxides such as $SiO_2$, $Al_2O_3$, MgO, $ZrO_2$, $TiO_2$, $B_2O_3$, CaO, ZnO, BaO, and $ThO_2$, and complexes or mixtures comprising them. For example, mention may be made of natural or synthetic zeolites such as $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO.

Examples of the inorganic halide include $MgCl_2$, $MgBr_2$, $MnCl_2$, and $MnBr_2$. The inorganic halide may be used as it is or may be used after being crushed using a ball mill or a vibrating mill. Alternatively, the inorganic halide may be dissolved in a solvent such as an alcohol and then precipitated into fine particles, using a precipitating agent, for use.

The clay is normally composed mainly of a clay mineral. The ion-exchange lamellar compound is a compound having a crystal structure where planes constituted by ionic bond or the like are parallelly stacked with each other through weak bonding force, and ions contained therein are exchangeable. A great majority of clay minerals are ion-exchange lamellar compounds. Examples of the clay, the clay mineral, or the ion-exchange lamellar compound include, for example, clays, clay minerals, and ionic crystalline compounds having a lamellar crystal structure such as hexagonal close-packed type, antimony type, $CdCl_2$ type, or $CdI_2$ type.

The clay or the clay mineral is also preferably chemically treated. Any of surface treatment of removing impurities attached to surface, treatment that influences the crystal structure of the clay, and the like can be used as the chemical treatment. Specific examples of the chemical treatment include acid treatment, alkali treatment, salt treatment, and organic matter treatment.

The D50 of volume statistics of the carrier (c) is preferably 1 to 500 µm, more preferably 2 to 200 µm, and still more preferably 5 to 50 µm. The D50 of volume statistics can be determined by a laser diffraction/scattering method using, for example, MT3300EX II manufactured by Microtrac Corp.

<Organic Compound Component (d)>

The metallocene catalyst may further contain an organic compound component (d), if necessary. The organic compound component (d) is used, if necessary, for the purpose of improving polymerization performance and the physical properties of the polymer to be produced. Examples of the organic compound component (d) include, for example, alcohols, phenolic compounds, carboxylic acids, phosphorus compounds, amides, polyethers, and sulfonates.

<<Polymerization Conditions>>

The polymerization of 4-methyl-1-pentene and the α-olefin having 2 to 20 carbon atoms for obtaining the copolymers (C) and (D) can be performed by either liquid phase polymerization methods such as solution polymerization and suspension polymerization or gas phase polymerization methods. In the liquid phase polymerization methods, an inert hydrocarbon solvent can be used, and specific examples thereof include aliphatic hydrocarbons such as propane, butane, pentane, hexane, heptane, octane, decane, dodecane, and kerosene; alicyclic hydrocarbons such as cyclopentane, cyclohexane, methylcyclopentane, and methylcyclohexane; aromatic hydrocarbons such as benzene, toluene, and xylene; halogenated hydrocarbons such as ethylene chloride, chlorobenzene, dichloromethane, trichloromethane, and tetrachloromethane; and mixed solvents of two or more selected therefrom. Alternatively, the olefin itself, including 4-methyl-1-pentene, may be used as the polymerization solvent.

For the olefin polymerization, the method for using each component and the order of addition are arbitrarily selected. Examples thereof include methods as listed below. Hereinafter, the metallocene compound (a), the co-catalyst (b), the carrier (c), and the organic compound component (d) are also referred to as "components (a) to (d)", respectively.

(i) A method of adding the components (a) to (c) in an arbitrary order to a polymerization reactor.
(ii) A method of adding a catalyst component comprising the components (a) to (b) supported by the component (c) to a polymerization reactor.

In each of the methods (i) to (ii), the component (d) may be further added at an arbitrary stage. Also, at least two catalyst components may be contacted in advance.

In the solid catalyst component comprising the component (a) supported by the component (c), an olefin such as 4-methyl-1-pentene or 3-methyl-1-pentene may be prepolymerized. A catalyst component may be further supported on the prepolymerized solid catalyst component.

Also, for the purpose of smoothly progressing the polymerization, an antistatic agent, an anti-fouling agent, and the like can be used.

For polymerizing olefins using a metallocene catalyst, the amount of each component to be used that is capable of constituting the metallocene catalyst is as described below. Hereinafter, the metallocene compound (a) and (b-1) to (b-3) listed in the co-catalyst (b) section are also referred to as the component (a) and the components (b-1) to (b-3), respectively.

The component (a) can be used in an amount of normally $10^{-10}$ to $10^{-2}$ mol, preferably $10^{-9}$ to $10^{-3}$ mol, per liter of reaction volume.

The component (b-1) can be used in an amount of, in terms of the molar ratio [(b-1)/M] between the component (b-1) and the transition metal atom (M; a transition metal of Group 4 of the periodic table) in the component (a), normally 10 to 10000, preferably 30 to 2000, and more preferably 50 to 1000.

The component (b-2) can be used in an amount of, in terms of the molar ratio [Al/M] between the aluminum atom (Al) in the component (b-2) and the transition metal atom (M) in the component (a), normally 10 to 10000, preferably 30 to 2000, and more preferably 50 to 1000.

The component (b-3) can be used in an amount of, in terms of the molar ratio [(b-3)/M] between the component (b-3) and the transition metal atom (M) in the component (a), normally 1 to 10000, preferably 2 to 2000, and more preferably 10 to 500.

The polymerization temperature is normally −50 to 200° C., preferably 0 to 100° C., and more preferably 20 to 100° C. The polymerization pressure is under conditions of normally ordinary pressure to a gauge pressure of 10 MPa, preferably ordinary pressure to a gauge pressure of 5 MPa. The polymerization reaction can be carried out by any of batch, semicontinuous, and continuous methods. Hydrogen can be added to the polymerization system for the purpose of controlling the molecular weight of the polymer to be produced or the polymerization activity, and an appropriate amount of hydrogen to be added is about 0.001 to 100 NL per kg of olefins.

As for the polymerization conditions, it is also possible to adopt multistage polymerization in which polymerization is carried out in two or more stages with different reaction conditions. For example, it is possible to obtain a polymer with the desired molecular weight distribution or composition distribution by performing stepwise polymerization under two kinds of conditions that differ in the amount of hydrogen to be used or in the ratio between 4-methyl-1-pentene and the α-olefin having 2 to 20 carbon atoms.

<Other Polymer Components>

The composition (X) can further contain other polymer components other than the copolymers (C) and (D) mentioned above. Examples of the other polymer component include an α-olefin polymer (E') (note that the copolymers (C) and (D) mentioned above are excluded) and an elastomer other than them.

The α-olefin polymer (E') is, for example, a polymer of an α-olefin having 2 to 20 carbon atoms (note that the copolymers (C) and (D) mentioned above are excluded), and examples thereof include a homopolymer or copolymer of an α-olefin having 2 to 20 carbon atoms.

Examples of the α-olefin having 2 to 20 carbon atoms include, for example, linear α-olefins such as ethylene, propylene, 1-butene, 1-pentene, 1-hexene, 1-octene, 1-decene, 1-undecene, 1-dodecene, 1-tetradecene, 1-hexadecene, 1-octadecene, and 1-eicosene; and branched α-olefins such as isobutene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, and 3-ethyl-1-hexene. Among these, α-olefins having 15 or less carbon atoms are preferable, and α-olefins having 10 or less carbon atoms are more preferable.

The α-olefin polymer (E') can further have constitutional units derived from another polymerizable compound, as mentioned above in the copolymer (C), to the extent that the purpose of the present invention is not impaired.

In the α-olefin polymer (E'), the content ratio of constitutional units derived from the other polymerizable compound is normally 10% by mol or less, preferably 5% by mol or less, and more preferably 3% by mol or less out of 100% by mol of the entire constitutional units constituting the (E').

Specific examples of the α-olefin polymer (E') include low density polyethylene; high density polyethylene; ethylene copolymers such as ethylene-propylene random copolymer, ethylene-1-butene random copolymer, ethylene-propylene-1-butene random copolymer, ethylene-1-hexene random copolymer, ethylene-1-octene random copolymer, ethylene-propylene-ethylidene norbornene random copolymer, ethylene-propylene-1-butene-ethylidene norbornene random copolymer, and ethylene-1-butene-1-octene random copolymer; propylene homopolymer; propylene copolymers such as propylene-1-butene random copolymer, propylene-1-hexene random copolymer, and propylene-1-octene random copolymer; 1-butene homopolymer; butene copolymers such as 1-butene-1-hexene random copolymer and 1-butene-1-octene random copolymer; 4-methyl-1-pentene homopolymer; and 4-methyl-1-pentene copolymers such as 4-methyl-1-pentene-1-hexene copolymer.

The α-olefin polymer (E') has an intrinsic viscosity $[\eta]_{E'}$ of normally 0.1 to 10 dL/g, preferably 0.5 to 5 dL/g, measured in decalin of 135° C.

The composition (X) can contain one kind or two or more kinds of α-olefin polymers (E').

In the composition (X), the content of the α-olefin polymer (E') is normally 50 parts by mass or less, and is preferably 40 parts by mass or less relative to 100 parts by mass of the contents of the copolymers (C) and (D) in total.
<Additives>

The composition (X) can contain conventional, publicly known additives.

Examples of the additive include, for example, secondary antioxidants, heat resistant stabilizers, weathering stabilizers, antistatic agents, slip agents, antiblocking agents, antifogging agents, lubricants, dyes, pigments, natural oils, synthetic oils, waxes, fillers, and hydrochloric acid absorbers. The content of the additive is not particularly limited, and it is normally 0 to 50 parts by mass, and is preferably 0 to 10 parts by mass relative to 100 parts by mass of the polymer component comprising the copolymers (C), (D), and the like.

The composition (X) can contain one kind or two or more kinds of additives.
<Method for Producing Composition (X)>

The composition (X) can be obtained by, for example, mixing the copolymers (C) and (D), and if necessary, other polymer components and/or additives.

As for the method for mixing each component, a variety of publicly known methods can be adopted, for example, a method in which each component is mixed using an apparatus such as a plastomill, a Henschel mixer, a V-blender, a ribbon blender, a tumbler, a blender, a kneader ruder; and a method in which, after the mixing described above, the resulting mixture is further melt-kneaded in an apparatus such as a single-screw extruder, a twin-screw extruder, a kneader, a Banbury mixer, and then the resulting melt-kneaded product is granulated or pulverized.

Alternatively, the mixture of the copolymers (C) and (D) can also be obtained by the following multistage polymerization method. Specifically, the mixture described above can be produced by the multistage polymerization method having step (1) in which the 4-methyl-1-pentene copolymer (D) is preferably produced by slurry polymerization, and step (2) in which the 4-methyl-1-pentene copolymer (C) is preferably produce by slurry polymerization in the presence of the copolymer (D) obtained in the step (1) such that the amount of the copolymer (C) falls within the range of 5 to 90 parts by mass with respect to 100 parts by mass of the total amount of the copolymers (C) and (D).

The multistage polymerization method has step (1) and step (2) differing in polymerization conditions, but it may be two-stage polymerization of steps (1) and (2), or may be three-stage or more polymerization comprising another step in addition to steps (1) and (2).
<<Step (1)>>

In step (1), the 4-methyl-1-pentene copolymer (D) is preferably produced by slurry polymerization. In step (1), the ratio of the amounts of 4-methyl-1-pentene and the α-olefin having 2 to 20 carbon atoms to be supplied is set such that the respective amounts of constitutional units derived from them fall within the above range.

In step (1), a slurry containing the copolymer (D) is obtained. The slurry concentration, that is, the copolymer (D) particle concentration, is normally 0.015 to 45% by mass, and is preferably 0.03 to 35% by mass.
<<Step (2)>>

In step (2), the 4-methyl-1-pentene copolymer (C) is preferably produced by slurry polymerization in the presence of the copolymer (D) obtained in step (1). In step (2), the ratio of the amounts of 4-methyl-1-pentene and the α-olefin having 5 to 20 carbon atoms to be supplied is set such that the amounts of constitutional units derived from them respectively fall within the above range.

In step (2), the copolymer (C) is produced such that the amount of the copolymer (C) falls within the range of 5 to 90 parts by mass with respect to 100 parts by mass of the total amount of the copolymer (D) obtained in step (1) and the copolymer (C) obtained in step (2).

In one embodiment, in step (2), to the slurry containing the copolymer (D), 4-methyl-1-pentene and the α-olefin having 5 to 20 carbon atoms can be added to carry out slurry polymerization of these monomers.

In step (2), a slurry containing particles containing the copolymer (C) and the copolymer (D) is obtained. The slurry concentration, that is, the particle concentration, is normally 3 to 50% by mass, and is preferably 5 to 40% by mass.

The multistage polymerization method normally adopts slurry polymerization. The "slurry polymerization" refers to polymerization characterized by that a polymer resulting from polymerization is present without being substantially dissolved in the medium used in the polymerization, for example, in a form dispersed as fine particles in the medium.
<<Solid-Liquid Separation Step>>

By subjecting the slurry containing 4-methyl-1-pentene polymer particles containing the copolymers (C) and (D) obtained in step (2) to solid-liquid separation, for example, by filtering the slurry, the particles can be separated and recovered.
<<Work-Up Step>>

For the 4-methyl-1-pentene polymer particles obtained by the multistage polymerization method, for example, for the particles obtained by the solid-liquid separation step, after production by the above method, if necessary, a publicly known work-up step such as a catalyst deactivation treatment step, a catalyst residue removal step, and a drying step may be carried out.

In the manner described above, the mixture of the copolymers (C) and (D) can be obtained.
[Properties of Film for Capacitors]

The thickness of the film for capacitors of the present embodiment is preferably 1 to 20 μm, more preferably 2 to 15 μm, and still more preferably 2.5 to 10 μm.

In the film for capacitors of the present embodiment, the ratio V (150° C.)/V (23° C.) between the dielectric breakdown strength at 23° C., V (23° C.), and the dielectric breakdown strength at 150° C., V (150° C.), is preferably 0.50 or more, more preferably 0.55 or more, and still more preferably 0.60 or more. In such a mode, the electrical properties under a long-term charge are stable, and the film is useful as a capacitor. Although the higher the upper limit value of the above ratio, the more excellent the electrical properties, it may be 0.95 in one embodiment.

In the film for capacitors of the present embodiment, the dielectric breakdown strength at 150° C., V (150° C.), is preferably 300 kV/mm or more, and is more preferably 320 kV/mm or more. The upper limit value of the dielectric breakdown strength V (150° C.) is not particularly limited, and in one embodiment, it may be 700 kV/mm.

In the film for capacitors of the present embodiment, the dielectric tangent at 23° C., tan δ (23° C.), is preferably $400 \times 10^{-5}$ or less, more preferably $380 \times 10^{-5}$ or less, and still more preferably $350 \times 10^{-5}$ or less.

In the film for capacitors of the present embodiment, the dielectric tangent at 150° C., tan δ (150° C.), is preferably $50 \times 10^{-5}$ or less, more preferably $40 \times 10^{-5}$ or less, and still more preferably $30 \times 10^{-5}$ or less.

In the film for capacitors of the present embodiment, the ratio tan δ (150° C.)/tan δ (23° C.) between tan δ (23° C.) and tan δ (150° C.) is preferably 0.10 or less, more preferably 0.09 or less, and still more preferably 0.08 or less.

A film for capacitors having tan δ (23° C.), tan δ (150° C.), and the ratio therebetween within the above ranges has low heat generation at a high temperature, and thus can maintain its quality even when used in a high temperature environment. In particular, the film for capacitors tends to have good dielectric loss properties at a high temperature and have superior electrical properties for a long service life.

Details of the measurement conditions for the physical properties will be given in the Examples section.

[Method for Producing Film for Capacitors]

The film for capacitors of the present embodiment is obtained by subjecting the film (the second mode (1)) containing the 4-methyl-1-pentene copolymer (C) or the film (the second mode (2)) composed of the composition (X) to biaxial stretching. More specifically, the film for capacitors is produced by firstly forming a film using the 4-methyl-1-pentene copolymer (C) or the composition (X) by, for example, the T-die extrusion molding method or the like in the range of 180 to 300° C., and then subjecting this film to biaxial stretching.

Note that, in the second mode (1), a film may be formed by mixing the copolymer (C) with other polymer components and/or additives as mentioned above.

The stretching ratio in terms of area is preferably 1.1 to 100 times, more preferably 2 to 90 times, and still more preferably 4 to 80 times. When the stretching ratio is within the above range, it is easier for the voltage withstand properties necessary for the film capacitor to be expressed.

The stretching method may be any method of the sequential biaxial stretching method or the simultaneous biaxial stretching method, but the sequential biaxial stretching method is preferable in terms of film production stability and thickness uniformity.

In the case of the sequential biaxial stretching method, for example, an unstretched film is obtained by extruding the 4-methyl-1-pentene copolymer (C) or the composition (X) by the T-die extrusion molding method or the like onto a cooling roll, this unstretched film is passed through a preheating roll set at a predetermined stretching temperature and stretched in the film longitudinal direction (MD direction) (longitudinal stretching), and then stretched in the film width direction (TD direction) while passed through a heating oven set at a predetermined stretching temperature (transverse stretching).

It is preferable that the stretching temperature for both longitudinal stretching and transverse stretching should be between the glass transition temperature (Tg) and the melting point (Tm) of the polymer used for stretching such as the 4-methyl-1-pentene copolymer (C). In the case of using the 4-methyl-1-pentene copolymer (C) alone, a film exhibiting the desired voltage withstand properties is easily obtained when stretching is performed at a stretching temperature of 100 to 220° C. Also, in the case of using the composition (X), a film exhibiting the desired voltage withstand properties is easily obtained when stretching is performed at a stretching temperature of 100 to 210° C. The stretching ratio in the film longitudinal direction and the film width direction is each independently, normally 1.2 to 11.0 times, preferably 1.4 to 9.5 times, and more preferably 2 to 9 times.

In addition, after the biaxial stretching, re-stretching may be performed in the film longitudinal direction or in the film width direction, or in the film longitudinal direction and film width direction. Also, after the biaxial stretching, an annealing treatment may be carried out. The annealing temperature is normally 100 to 230° C., and is preferably 130 to 220° C.

[Metallized Film]

A metallized film of the present embodiment has the film for capacitors described above and a metal film provided on at least one face of the film for capacitors.

The method for providing a metal film on the film for capacitors to form a metallized film is not particularly limited, but for example, a method is preferable in which a metal such as aluminum is vapor-deposited on at least one face of the film for capacitors to provide a metal film such as an aluminum vapor-deposited film, which serves as the internal electrode of the film capacitor. At this time, another metal component, for example, nickel, copper, gold, silver, chromium, zinc, and the like may be vapor-deposited simultaneously with or sequentially with aluminum. A protecting layer may also be provided on the vapor-deposited film with oil or the like.

It is preferable that the thickness of the metal film should be 20 to 100 nm in terms of the electrical properties and self-healing properties of the film capacitor. Also, for the same reason, it is preferable that the surface electrical resistance value of the metal film should be 1 to 20 Ω/sq. The surface electrical resistance value can be controlled by the metal type to be used and the thickness.

After forming the metal film, if necessary, the metallized film can be subjected to an aging treatment at a particular temperature or a heat treatment. Also, for the purpose of insulation or others, a coating such as polyphenylene oxide can be applied to at least one face of the metallized film.

[Film Capacitor]

A film capacitor of the present embodiment has the metallized film. More specifically, the film capacitor of the present embodiment is produced by laminating or winding the metalized film by a variety of methods. The following is an illustration of the preferable method for producing a wound film capacitor.

A metal such as aluminum is vacuum-deposited on one face of the film for capacitors. At that time, the metal is vapor-deposited in a stripe pattern such that margin sections running in the film longitudinal direction are formed. Next, the surface is slit by inserting a blade in the center of each vapor-deposition section and in the center of each margin section to create a take-up reel in the form of a tape, with the surface having the margin on one side. One tape reel with the margin on the left side and one tape reel with the margin on the right side are overlapped and wound together such that the vapor-deposited parts stick out beyond the margin parts in the width direction, thereby obtaining a wound body. After removing the core material from this wound body, it is pressed, metallikon is sprayed on both end faces to make external electrodes, and a lead wire is welded to the metallikon, thereby obtaining a wound film capacitor.

The applications of film capacitors are diverse, including those for vehicles, home appliances (TVs, refrigerators, and the like), general miscellaneous protection, automobiles (hybrid cars, power windows, wipers, and the like), power supplies, and the like, and the film capacitor of the present embodiment can also be suitably used for these applications.

EXAMPLES

Hereinafter, the present invention will be described in more detail with reference to Examples. However, the present invention is not limited by these Examples. In the following description, "parts" represent "parts by mass" unless otherwise noted.

[Methods for Measuring Various Physical Properties]
<Contents of Constitutional Units in 4-Methyl-1-pentene Copolymer>

The amount of constitutional units derived from 4-methyl-1-pentene (4-methyl-1-pentene content) and the amount of constitutional units derived from the linear α-olefin (α-olefin content) were calculated from the $^{13}$C-NMR spectrum using the following apparatus and conditions. Similarly, the amount of constitutional units derived from 4-methyl-1-pentene (4-methyl-1-pentene content) and the amount of constitutional units derived from the α-olefin other than 4-methyl-1-pentene (α-olefin content) were calculated from the $^{13}$C-NMR spectrum using the following apparatus and conditions.

The measurement was performed using a nuclear magnetic resonance apparatus, ECP500 model manufactured by JEOL Ltd., under the following conditions: solvent: a mixed solvent of o-dichlorobenzene/hexadeuterobenzene (80/20% by volume); sample concentration: 55 mg/0.6 mL; measurement temperature: 120° C.; observed nucleus: $^{13}$C (125 MHz); sequence: single-pulse proton decoupling; pulse width: 4.7 μsec (45° pulse); repetition time: 5.5 sec; number of scans: 10,000 or more; and chemical shift reference value: 27.50 ppm. From the obtained $^{13}$C-NMR spectrum, the compositions of 4-methyl-1-pentene, the linear α-olefin, and the α-olefin other than 4-methyl-1-pentene were quantified.

<Intrinsic Viscosity [η]>

The intrinsic viscosity [η] was measured using a decalin solvent at 135° C. That is, about 20 mg of polymerized powder, pellets, or resin mass was dissolved in 15 ml of decalin, and the specific viscosity ηsp was measured in an oil bath at 135° C. After diluting this decalin solution by adding 5 ml of a decalin solvent, the specific viscosity ηsp was measured in the same manner. This dilution operation was further repeated two times, and the value of ηsp/C when the concentration (C) was extrapolated to zero was determined as the intrinsic viscosity (see the expression below).

$$[\eta]=\lim(\eta sp/C) \ (C\to 0)$$

<Melting Point (Tm)>

Using a DSC measurement apparatus (DSC220C) manufactured by Seiko Instruments Inc., about 5 mg of the sample was placed in an aluminum pan for measurement, and the temperature was increased to 290° C. at 100° C./min, held at 290° C. for 5 min, then decreased to −100° C. at 10° C./min, and then increased from −100° C. to 290° C. at 10° C./min. The melting point (Tm) was calculated from the peak summit of the crystal melting peak in the calorimetric curve at the second temperature increase.

<CFC and Molecular Weight Measurements>

The CFC and molecular weight measurements were carried out under the following conditions.

Apparatus: CFC2 cross fractionation chromatograph (Polymer Characterization, S.A.)

Detector (built-in): IR4 infrared spectrophotometer (Polymer Characterization, S.A.)

Detection wavelength: 3.42 μm (2,920 cm$^{-1}$); fixed

Sample concentration: 30 mg/30 mL (diluted with o-dichlorobenzene (ODCB))

Injection volume: 0.5 mL

Temperature conditions: the temperature was increased to 145° C. at 40° C./min and kept for 30 minutes. Then, after decreasing the temperature to 0° C. at 1° C./min and kept for 60 minutes, the amount of an eluate for each elution segment was evaluated. Temperature change among the segments was set to 40° C./min.

The boundaries of the elution segments were set at 0, 5, 10, 15, 20, 25, 30, 35, 50, 70, 90, 95, 100, 102, 104, 106, 108° C. for the range of 0 to 108° C., every 1° C. from 108° C. to 135° C., and 135, 140, 145° C. for the range of 135 to 145° C., and the amount of an eluate at each segment was evaluated.

GPC column: Shodex HT-806M×3 (manufactured by Showa Denko K.K.)

GPC column temperature: 145° C.

GPC column calibration: monodisperse polystyrene (Tosoh Corp.)

Molecular weight calibration method: preparation calibration method (in terms of polystyrene)

Mobile phase: o-dichlorobenzene (ODCB) supplemented with BHT

Flow rate: 1.0 mL/min

PRODUCTION EXAMPLES

[Synthesis of Transition Metal Complex]

According to Synthesis Example 4 of International Publication No. WO 2014/050817, (8-octamethylfluoren-12'-yl-(2-(adamantan-1-yl)-8-methyl-3,3b,4,5,6,7,7a,8-octahydro-cyclopenta[a]indene))zirconium dichloride (catalyst (A)) was synthesized.

[Preparation of Solid Catalyst Component]

A 100 mL three-neck flask equipped with a stirrer and thoroughly purged with nitrogen was charged with 32 mL of purified decane and 14.65 mmol (in terms of an aluminum atom) of a solid polymethylaluminoxane (manufactured by Tosoh Finechem Corp.) at 30° C. under a stream of nitrogen, thereby giving a suspension. Using 50 mg (0.059 mmol in terms of a zirconium atom) of the catalyst (A), which had been synthesized beforehand, a 4.6 mmol/L toluene solution was prepared, and 12.75 mL of this solution was added to the suspension with stirring. After 1.5 hours, stirring was stopped, and the obtained catalyst component was washed three times with 50 mL of decane by the decantation method and suspended in decane to obtain 50 mL of a slurry solution (B). The supporting rate of Zr in this catalyst component was 100%.

[Preparation of Prepolymerization Catalyst Component]

The slurry solution (B) thus prepared was charged with 0.4 mL of a decane solution of triethylaluminum (0.2 mmol/mL in terms of an aluminum atom) and further with 7.5 mL (5.0 g) of 3-methyl-1-pentene under a stream of nitrogen. After 1.5 hours, stirring was stopped, and the obtained prepolymerization catalyst component was washed three times with 50 mL of decane by the decantation method. This prepolymerization catalyst component was suspended in decane to obtain 50 mL of a decane slurry (C). The concentration of the prepolymerization catalyst component in the decane slurry (C) was 20 g/L, 1.05 mmol-Zr/L, and the Zr recovery rate was 90%.

Hereinafter, the first mode described above will be described further specifically.

Production Example 1-1

To a SUS polymerization reactor (internal capacity: 1 L) equipped with a stirrer, 425 mL of purified decane, 0.4 mL (0.4 mmol) of a decane solution of triethylaluminum (1.0 mmol/mL in terms of an aluminum atom), and 0.0005 mmol (in terms of a zirconium atom) of the decane slurry (C) of the prepolymerization catalyst component, which had been prepared beforehand, were added at room temperature under a stream of nitrogen, and 40 NmL of hydrogen was charged (the first hydrogen charge). Then, a mixed solution of 106 mL of 4-methyl-1-pentene and 2.8 mL of a 16-carbon atoms/18-carbon atoms α-olefin mixture (trade name; LINEALENE 168, manufactured by Idemitsu Kosan Co., Ltd.) was continuously charged into the polymerization reactor at a constant rate over a period of 2 hours. The point at which the charging started was defined as the start of polymerization, and the temperature was increased to 45° C. over 30 minutes from the start of polymerization, then held at 45° C. for 4 hours. 3 hours after the start of polymerization, 90 NmL of hydrogen was charged (the second hydrogen charge). 4.5 hours after the start of polymerization, the temperature was decreased to room temperature, followed by depressurization. Immediately thereafter, the polymerization solution including a white solid was filtered, thereby obtaining a solid substance. This solid substance was dried under reduced pressure at 80° C. for 8 hours, thereby obtaining a 4-methyl-1-pentene copolymer (A-1).

Production Examples 1-2 and 1-3

4-Methyl-1-pentene copolymers (A-2) and (A-3) were obtained in the same manner as in Production Example 1-1, except that the 4-methyl-1-pentene content and the 16-carbon atoms/18-carbon atoms α-olefin mixture content in the copolymers to be obtained were changed to the values in Table 1-1.

Production Examples 1-4 and 1-5

4-Methyl-1-pentene copolymers (A-4) and (A-5) were obtained in the same manner as in Production Example 1-1, except that 1-decene was used instead of the 16-carbon atoms/18-carbon atoms α-olefin mixture and that the 4-methyl-1-pentene content and the 1-decene content in the copolymers to be obtained were changed to the values in Table 1-1.

Production Example 1-6

A 4-methyl-1-pentene copolymer (A-6) was obtained in the same manner as in Production Example 1-1, except that 1-hexene was used instead of the 16-carbon atoms/18-carbon atoms α-olefin mixture and that the 4-methyl-1-pentene content and the 1-hexene content in the copolymer to be obtained were changed to the values in Table 1-1.

Production Example 1-7

A 4-methyl-1-pentene copolymer (A-7) was obtained in the same manner as in Production Example 1-1, except that ethylene was used instead of the 16-carbon atoms/18-carbon atoms α-olefin mixture and that the 4-methyl-1-pentene content and the ethylene content in the copolymer to be obtained were changed to the values in Table 1-1.

Production Examples 1-8, 1-9, 1-10, and 1-18

4-Methyl-1-pentene copolymers (B-1), (B-2), (B-7), and (B-8) were obtained in the same manner as in Production Example 1-1, except that the 4-methyl-1-pentene content and the 16-carbon atoms/18-carbon atoms α-olefin mixture content in the copolymers to be obtained were changed to the values in Table 1-2.

Production Examples 1-11 and 1-12

4-Methyl-1-pentene copolymers (B-3) and (B-4) were obtained in the same manner as in Production Example 1-1, except that 1-decene was used instead of the 16-carbon atoms/18-carbon atoms α-olefin mixture and that the 4-methyl-1-pentene content and the 1-decene content in the copolymers to be obtained were changed to the values in Table 1-2.

Production Example 1-13

A 4-methyl-1-pentene copolymer (B-5) was obtained in the same manner as in Production Example 1-1, except that 1-hexene was used instead of the 16-carbon atoms/18-carbon atoms α-olefin mixture and that the 4-methyl-1-pentene content and the 1-hexene content in the copolymer to be obtained were changed to the values in Table 1-2.

Production Example 1-14

A 4-methyl-1-pentene copolymer (B-6) was obtained in the same manner as in Production Example 1-1, except that ethylene was used instead of the 16-carbon atoms/18-carbon atoms α-olefin mixture and that the 4-methyl-1-pentene content and the ethylene content in the copolymer to be obtained were changed to the values in Table 1-2.

Production Examples 1-15 and 1-16

A 4-methyl-1-pentene homopolymer (E-2) and a 4-methyl-1-pentene copolymer (E-3) were obtained in the same manner as in Production Example 1-1, except that the 4-methyl-1-pentene content and the 16-carbon atoms/18-carbon atoms α-olefin mixture content in the polymers to be obtained were changed to the values in Table 1-3.

Production Example 1-17

In accordance with the polymerization method described in Comparative Example 9 of International Publication No. WO 2006/054613, a 4-methyl-1-pentene copolymer (E-1) was obtained by changing the proportions of 4-methyl-1-pentene, the 16-carbon atoms/18-carbon atoms α-olefin mixture, and hydrogen. That is, the copolymer (E-1) described above was obtained by using, as a catalyst for polymerization, a solid titanium catalyst obtained by reacting anhydrous magnesium chloride, 2-ethylhexyl alcohol, 2-isobutyl-2-isopropyl-1,3-dimethoxypropane, and titanium tetrachloride.

TABLE 1-1

| | | | 4-Methyl-1-pentene copolymer (A) | | | | | | |
|---|---|---|---|---|---|---|---|---|---|
| | | | Production Example 1-1 (A-1) | Production Example 1-2 (A-2) | Production Example 1-3 (A-3) | Production Example 1-4 (A-4) | Production Example 1-5 (A-5) | Production Example 1-6 (A-6) | Production Example 1-7 (A-7) |
| Resin physical properties | 4-Methyl-1-pentene content (U1) | mol % | 99.1 | 99.5 | 98.7 | 98.2 | 98.9 | 94.0 | 97.0 |
| | α-Olefin type | | 1-Hexadecene 1-Octadecene | 1-Hexadecene 1-Octadecene | 1-Hexadecene 1-Octadecene | 1-Decene | 1-Decene | 1-Hexene | Ethylene |
| | α-Olefin content (U2) | mol % | 0.9 | 0.5 | 1.3 | 1.8 | 1.1 | 6.0 | 3.0 |
| | $[\eta]_A$ | dL/g | 2.9 | 1.8 | 2.6 | 2.5 | 1.8 | 2.0 | 2.3 |
| | Melting point (Tm) | °C. | 228 | 230 | 221 | 223 | 226 | 230 | 210 |
| CFC Data | Presence or absence of a peak of the amount of a component eluted in the range of 100 to 140° C. | | Present | Present | Present | Present | Present | Present | Present |
| | Presence or absence of a peak of the amount of a component eluted in the range of 0° C. or higher and lower than 100° C. | | Absent | Absent | Absent | Absent | Absent | Absent | Absent |
| | Mw/Mn of a component eluted in the range of 100 to 140° C. | | 2.3 | 2.6 | 2.2 | 2.6 | 2.3 | 2.3 | 2.6 |
| | Amount of a component eluted in the range of 135° C. or higher | Wt % | 0 | 0 | 0 | 0 | 0 | 0 | 0 |

TABLE 1-2

| | | | 4-Methyl-1-pentene copolymer (B) | | | | | | | |
|---|---|---|---|---|---|---|---|---|---|---|
| | | | Production Example 1-8 (B-1) | Production Example 1-9 (B-2) | Production Example 1-11 (B-3) | Production Example 1-12 (B-4) | Production Example 1-13 (B-5) | Production Example 1-14 (B-6) | Production Example 1-10 (B-7) | Production Example 1-18 (B-8) |
| Resin physical properties | 4-Methyl-1-pentene content (U3) | mol % | 90.1 | 89.1 | 88.4 | 82.2 | 27.0 | 87.2 | 96.0 | 89.2 |
| | α-Olefin type | | 1-Hexadecene 1-Octadecene | 1-Hexadecene 1-Octadecene | 1-Decene | 1-Decene | 1-Hexene | Ethylene | 1-Hexadecene 1-Octadecene | 1-Hexadecene 1-Octadecene |
| | α-Olefin content (U4) | mol % | 9.9 | 10.9 | 11.6 | 17.8 | 73.0 | 12.8 | 4.0 | 10.8 |
| | $[\eta]_B$ | dL/g | 3.9 | 3.5 | 4.0 | 2.5 | 4.4 | 2.6 | 3.9 | 6.4 |
| | Melting point (Tm) | °C. | Absent | Absent | 123 | Absent | Absent | 123 | 180 | Absent |
| CFC Data | Presence or absence of a peak of the amount of a component eluted in the range of 100 to 140° C. | | Absent | Absent | Absent | Absent | Absent | Absent | Absent | Absent |
| | Presence or absence of a peak of the amount of a component eluted in the range of 0° C. or higher and lower than 100° C. | | Present | Present | Present | Present | Present | Present | Present | Present |
| | Mw/Mn of a component eluted in the range of 0° C. or higher and lower than 100° C. | | 2.4 | 4.1 | 3.7 | 2.6 | 5.6 | 4.8 | 2.6 | 4.5 |

TABLE 1-2-continued

| | | 4-Methyl-1-pentene copolymer (B) | | | | | | | |
|---|---|---|---|---|---|---|---|---|---|
| | | Production Example 1-8 (B-1) | Production Example 1-9 (B-2) | Production Example 1-11 (B-3) | Production Example 1-12 (B-4) | Production Example 1-13 (B-5) | Production Example 1-14 (B-6) | Production Example 1-10 (B-7) | Production Example 1-18 (B-8) |
| Amount of a component eluted at 0° C. | Wt % | 0 | 5.3 | 0 | 0 | 11.9 | 3.1 | 0 | 0 |
| Mn of a component eluted at 0° C. | | | $9.9 \times 10^5$ | | | $3.0 \times 10^5$ | $1.0 \times 10^5$ | | |

TABLE 1-3

| | | | Production Example 1-17 (E-1) | Production Example 1-15 (E-2) | Production Example 1-16 (E-3) |
|---|---|---|---|---|---|
| Resin physical properties | 4-Methyl-1-pentene content | mol % | 97 | 100 | 90.5 |
| | α-Olefin type | | 1-Hexadecene 1-Octadecene | | 1-Hexadecene 1-Octadecene |
| | α-Olefin content | mol % | 3.0 | | 9.5 |
| | $[\eta]_E$ | dL/g | 2.1 | 2.3 | 1.9 |
| | Melting point (Tm) | ° C. | 228 | 238 | |
| CFC Data | Presence or absence of a peak of the amount of a component eluted in the range of 100 to 140° C. | | Present | Present | Absent |
| | Presence or absence of a peak of the amount of a component eluted in the range of 0° C. or higher and lower than 100° C. | | Present | Absent | Present |
| | Mw/Mn of a component eluted in the range of 100 to 140° C. | | 6.0 | 2.2 | |
| | Mw/Mn of a component eluted in the range of 0° C. or higher and lower than 100° C. | | 9.9 | | 3.7 |
| | Amount of a component eluted in the range of 135° C. or higher | Wt % | | 11.0 | |
| | Amount of a component eluted at 0° C. | Wt % | 1.9 | 0 | 0 |
| | Mn of a component eluted at 0° C. | | $2.4 \times 10^2$ | | |

TABLE 1-4

| | | | Example 1-1 | Example 1-2 | Example 1-3 | Example 1-4 | Example 1-5 | Example 1-6 | Example 1-7 | Example 1-8 | Example 1-9 | Example 1-10 | Example 1-11 | Comparative Example 1-1 | Comparative Example 1-2 | Comparative Example 1-3 |
|---|---|---|---|---|---|---|---|---|---|---|---|---|---|---|---|---|
| Mixing composition | 4-Methyl-1-pentene copolymer (A) | | (A-1) | (A-2) | (A-4) | (A-5) | (A-3) | (A-6) | (A-2) | (A-2) | (A-7) | (A-2) | (A-2) | (A-1) | | (A-6) |
| | 4-Methyl-1-pentene copolymer (B) | | (B-1) | (B-2) | (B-3) | (B-4) | (B-2) | (B-5) | (B-2) (B-7) | (B-6) | (B-6) | (B-2) | (B-8) | | (B-1) | (B-7) |
| | α-Olefin polymer (E) | | | | | | | | | | | (E-2) | | (E-3) | (E-1) | |
| | 4-Methyl-1-pentene copolymer (A) | Wt % | 70 | 60 | 70 | 60 | 85 | 75 | 56 | 70 | 70 | 56 | 65 | 70 | | 70 |
| | 4-Methyl-1-pentene copolymer (B) | Wt % | 30 | 40 | 30 | 40 | 15 | 25 | 22 22 | 30 | 30 | 24 | 35 | | 30 | 30 |
| | α-Olefin polymer (E) | Wt % | | | | | | | | | | 20 | | 30 | 70 | |
| Resin physical properties | 4-Methyl-1-pentene content | mol % | 96.4 | 95.3 | 95.3 | 92.2 | 97.3 | 77.2 | 96.4 | 95.8 | 94.1 | 97.1 | 95.9 | 96.5 | 94.9 | 94.6 |
| | α-Olefin content | mol % | 3.6 | 4.7 | 4.7 | 7.8 | 2.7 | 22.8 | 3.6 | 4.2 | 5.9 | 2.9 | 4.1 | 3.5 | 5.1 | 5.4 |
| | $[\eta]_B/[\eta]_A$ | | 1.3 | 1.9 | 1.6 | 1.4 | 1.3 | 2.2 | 2.0 | 1.4 | 1.1 | 1.9 | 3.6 | | | 2.0 |
| | U4/U2 | | 11.0 | 21.8 | 6.4 | 16.2 | 8.4 | 12.2 | 14.9 | 25.6 | 4.3 | 21.8 | 21.6 | | | 0.7 |
| | Maximum melting point | °C. | 228 | 230 | 223 | 226 | 221 | 230 | 230 | 230 | 210 | 238 | 238 | 228 | 228 | 230 |
| CFC | Amount of a component eluted at 135° C. or higher | Wt % | 0 | 0 | 0 | 0 | 0 | 0 | 0 | 0 | 0 | 2.4 | 0 | 0 | 0 | 0 |
| Film properties | Film tensile modulus of elasticity (MD) | MPa | 942 | 848 | 1023 | 868 | 1125 | 777 | 1089 | 981 | 820 | 1078 | 983 | 960 | 730 | 1112 |
| | Stretching evaluation 1 (batch stretching) | Stretchability | AA | AA | AA | | AA | AA | AA | BB | BB | BB | AA | CC | CC | DD |
| | | Lower limit value of film thinning μm | 5 | 5 | 5 | | 5 | 6 | 5 | 6 | 8 | 8 | 5 | 10 | 10 | 15 |
| | Haze after stretching | | AA | AA | AA | AA | AA | AA | AA | BB | AA | AA | AA | | | |
| | | | AA | AA | AA | | AA | AA | AA | BB | AA | AA | AA | | | |

[Resin Composition]

Example 1-1

To 100 parts of a mixture obtained by mixing 70 parts of the 4-methyl-1-pentene copolymer (A-1) and 30 parts of the 4-methyl-1-pentene copolymer (B-1), 0.1 parts of tri(2,4-di-t-butylphenyl) phosphate as a secondary antioxidant, 0.1 parts of n-octadecyl-3-(4'-hydroxy-3',5'-di-t-butylphenyl) propionate as a heat resistant stabilizer, and 0.1 parts of calcium stearate as a hydrochloric acid absorber were mixed in. Then, the resulting compound was granulated under conditions with a set temperature of 270° C. and an amount of the resin extruded of 60 g/min at 200 rpm using a twin-screw extruder BT-30 manufactured by Research Laboratory of Plastics Technology Co., Ltd. (screw diameter: 30 mmφ, L/D=46), thereby obtaining pellets.

Examples 1-2 to 1-11 and Comparative Examples 1-1 to 1-3

The same procedure as in Example 1-1 was carried out except that the mixing composition in 100 parts of the mixture was changed as described in Table 1-4.

<Production of Films>

The pellets obtained as described above were melt-cast-molded under conditions involving a cylinder temperature of 270° C., a dice temperature of 270° C., a roll temperature of 80° C., and a take-over speed of 1 m/min using a single-screw sheet molding machine manufactured by Tanaka Iron Works Co., Ltd., thereby obtaining films having a thickness of 100 μm or 50 μm.

<Tensile Modulus of Elasticity>

Evaluation of the tensile modulus of elasticity was performed in accordance with JIS K7127-2, using films having a thickness of 50 μm obtained in the <Production of films> as test pieces and using a universal tensile testing machine 3380 manufactured by Instron at a pulling rate of 200 mm/min.

<Film Stretchability Evaluation 1 (Batch Stretching)>

The films having a thickness of 100 μm obtained in the <Production of films> were cut into 120 mm×120 mm, and preheated at 160° C. for 1 minute and then subjected to simultaneous biaxial stretching at a stretching speed of 5 m/min using a batch-type biaxial stretching machine manufactured by BRUCKNER Maschinenbau GmbH & Co. KG, thereby obtaining biaxially stretched films. Stretching was performed at a stretching ratio of 2.5×2.5 times (Machine Direction (MD): 2.5 times, and Transverse Direction (TD): 2.5 times), 3.0×3.0 times, 3.5×3.5 times, and 4.0×4.0 times, and evaluation of stretchability was performed based on the state of the films after the stretching as follows.

AA: Stretchable up to 4.0 times×4.0 times
BB: Stretchable up to 3.5 times×3.5 times
CC: Stretchable up to 3.0 times×3.0 times
DD: Stretchable up to 2.5 times×2.5 times
EE: Uniform stretching could not be performed (unstretchable) because of film breakage or large unevenness in film thickness.

<Lower Limit Value of Film Thinning>

In the stretchability evaluation 1, the thickness of the films after the stretching was measured using a micrometer. The measurement was carried out at 10 points in the width direction and 10 points in the length direction, and the average value thereof was used as the thickness of the films. The thickness described here refers to the thickness of the film when it was stretched at the maximum ratio by which the stretching was possible among the stretching ratios in the evaluations AA to DD.

<Haze after Stretching>

The haze after stretching was evaluated only when the stretchability evaluation was AA or BB. The evaluation was carried out as follows. The haze value in air (total haze) was evaluated in accordance with JIS-K-7136 using a haze meter NDH4000 manufactured by Nippon Denshoku Industries Co., Ltd. A high haze after stretching may indicate the occurrence of surface roughness or internal defects in the films, and therefore, the lower the haze after stretching, the more excellent the stretchability.

AA: Total haze of less than 15%
BB: Total haze of 15% or more

Hereinafter, the second mode described above will be described further specifically.

PRODUCTION EXAMPLES

Production Example 2-1

A 4-methyl-1-pentene copolymer (C-1) was obtained in accordance with Production Example 2 of Japanese Patent Laid-Open No. 2018-162408 ([0186] to [0189]), except that the proportions of 4-methyl-1-pentene and 1-hexene to be used were changed such that the 4-methyl-1-pentene content and the 1-hexene content in the copolymer to be obtained in that Production Example were the values in Table 2-1, and that the value of $[\eta]_C$ was changed to the value in Table 2-1.

Production Example 2-2

A 4-methyl-1-pentene copolymer (C-2) was obtained in accordance with Production Example 1 of Japanese Patent Laid-Open No. 2018-162408 ([0182] to [0185]), except that 1-hexadecene/1-octadecene was changed to 1-decene, that the proportions of 4-methyl-1-pentene and 1-decene to be used were changed such that the 4-methyl-1-pentene content and the 1-decene content in the copolymer to be obtained in that Production Example were the values in Table 2-1, and that the value of $[\eta]_C$ was changed to the value in Table 2-1.

Production Examples 2-3, 2-4, and 2-11

4-Methyl-1-pentene copolymers (C-3), (C-4), and (C-5) were obtained in accordance with Production Example 1 of Japanese Patent Laid-Open No. 2018-162408 ([0182] to [0185]), except that the proportions of 4-methyl-1-pentene, 1-hexadecene, and 1-octadecene to be used were changed such that the 4-methyl-1-pentene content and the α-olefin content in the copolymer to be obtained in that Production Example were the values in Table 2-1, and that the value of $[\eta]_C$ was changed to the value in Table 2-1.

Production Example 2-5

To a SUS autoclave (capacity: 1.5 L) equipped with stirring blades and thoroughly purged with nitrogen, 300 ml of n-hexane (dried on activated alumina in a dry nitrogen atmosphere) and 450 ml of 4-methyl-1-pentene were charged at 23° C. To this autoclave, 0.75 ml of a 1.0 mmol/ml toluene solution of triisobutylaluminum (TIBAL) was charged, and the stirrer was turned.

The autoclave was then heated until the internal temperature reached 60° C., and pressurized with ethylene such that the total pressure reached 0.10 MPa (gauge pressure). Subsequently, 0.34 ml of a toluene solution including 1 mmol of methylaluminoxane (in terms of Al) and 0.01 mmol of diphenylmethylene(1-ethyl-3-t-butyl-cyclopentadienyl) (2,7-di-t-butyl-fluorenyl)zirconium dichloride, which had been prepared beforehand, was pressed into the autoclave with nitrogen, and the polymerization was started. During the polymerization reaction, the temperature was adjusted such that the internal temperature of the autoclave was 60° C. 60 minutes after the start of polymerization, 5 ml of methanol was pressed into the autoclave with nitrogen to stop the polymerization, and the autoclave was depressurized to the atmospheric pressure. Acetone was poured into the reaction solution with stirring.

The resulting powdered polymer including the solvent was dried under reduced pressure at 100° C. for 12 hours to obtain a 4-methyl-1-pentene copolymer (D-1).

Production Example 2-6

To a SUS polymerization reactor (internal capacity: 1 L) equipped with a stirrer, 425 mL of purified decane, 0.4 mL (0.4 mmol) of a decane solution of triethylaluminum (1.0 mmol/mL in terms of an aluminum atom), and 0.0005 mmol (in terms of a zirconium atom) of the decane slurry (C) of the prepolymerization catalyst component, which had been prepared beforehand, were added at room temperature under a stream of nitrogen, and 40 NmL of hydrogen was charged (the first hydrogen charge). Then, a mixed solution of 106 mL of 4-methyl-1-pentene and 5.9 mL of 1-hexene was continuously charged into the polymerization reactor at a constant rate over a period of 2 hours. The point at which the charging started was defined as the start of polymerization, and the temperature was increased to 45° C. over 30 minutes from the start of polymerization, then held at 45° C. for 4 hours. 3 hours after the start of polymerization, 90 NmL of hydrogen was charged (the second hydrogen charge). 4.5 hours after the start of polymerization, the temperature was decreased to room temperature, followed by depressurization. Immediately thereafter, the polymerization solution including a white solid was filtered, thereby obtaining a solid substance. This solid substance was dried under reduced pressure at 80° C. for 8 hours, thereby obtaining a 4-methyl-1-pentene copolymer (D-2).

Production Example 2-7

A 4-methyl-1-pentene copolymer (D-3) was obtained in accordance with Production Example 2-6, except that 1-decene was used instead of 1-hexene, that each proportion to be used was changed such that the 4-methyl-1-pentene content and the 1-decene content in the copolymer to be obtained were the values in Table 2-2, and that the value of $[\eta]_D$ was changed to the value in Table 2-2.

Production Example 2-8

A 4-methyl-1-pentene copolymer (D-4) was obtained in accordance with Production Example 2-6, except that a 16-carbon atoms/18-carbon atoms α-olefin mixture (trade name; LINEALENE 168, manufactured by Idemitsu Kosan Co., Ltd.) was used instead of 1-hexene, that each proportion to be used was changed such that the 4-methyl-1-pentene content and the 16-carbon atoms/18-carbon atoms α-olefin mixture content in the copolymer to be obtained were changed to the values in Table 2-2, and that the value of $[\eta]_D$ was changed to the value in Table 2-2.

Production Example 2-9

In accordance with the polymerization method described in Comparative Example 9 of International Publication No. WO 2006/054613, a 4-methyl-1-pentene copolymer (E'-1) was obtained by changing the proportions of 4-methyl-1-pentene, the 16-carbon atoms/18-carbon atoms α-olefin mixture, and hydrogen. That is, the copolymer (E'-1) described above was obtained by using, as a catalyst for polymerization, a solid titanium catalyst obtained by reacting anhydrous magnesium chloride, 2-ethylhexyl alcohol, 2-isobutyl-2-isopropyl-1,3-dimethoxypropane, and titanium tetrachloride.

[Product]

As the α-olefin polymer, a homopolypropylene (E'-2) (manufactured by Prime Polymer Co., Ltd., part number: F123P) was used.

Production Example 2-10

To a SUS autoclave (capacity: 1.5 L) equipped with stirring blades and thoroughly purged with nitrogen, 300 ml of n-hexane (dried on activated alumina in a dry nitrogen atmosphere) and 450 ml of 4-methyl-1-pentene were charged at 23° C. To this autoclave, 0.75 ml of a 1.0 mmol/ml toluene solution of triisobutylaluminum (TIBAL) was charged, and the stirrer was turned.

The autoclave was then heated until the internal temperature reached 60° C., and pressurized with propylene such that the total pressure reached 0.40 MPa (gauge pressure). Subsequently, 0.34 ml of a toluene solution including 1 mmol of methylaluminoxane (in terms of Al) and 0.01 mmol of diphenylmethylene(1-ethyl-3-t-butyl-cyclopentadienyl) (2,7-di-t-butyl-fluorenyl)zirconium dichloride, which had been prepared beforehand, was pressed into the autoclave with nitrogen, and the polymerization was started. During the polymerization reaction, the temperature was adjusted such that the internal temperature of the autoclave was 60° C. 60 minutes after the start of polymerization, 5 ml of methanol was pressed into the autoclave with nitrogen to stop the polymerization, and the autoclave was depressurized to the atmospheric pressure. Acetone was poured into the reaction solution with stirring.

The resulting powdered polymer containing the solvent was dried under reduced pressure at 100° C. for 12 hours to obtain a 4-methyl-1-pentene copolymer (E'-3).

TABLE 2-1

| | | | 4-Methyl-1-pentene copolymer (C) | | | | |
|---|---|---|---|---|---|---|---|
| | | | Production Example 2-1 (C-1) | Production Example 2-2 (C-2) | Production Example 2-3 (C-3) | Production Example 2-4 (C-4) | Production Example 2-11 (C-5) |
| Polymer physical properties | 4-Methyl-1-pentene content(U5) | mol % | 27.0 | 82.2 | 89.1 | 96.6 | 89.2 |
| | α-Olefin type | | 1-Hexene | 1-Decene | 1-Hexadecene 1-Octadecene | 1-Hexadecene 1-Octadecene | 1-Hexadecene 1-Octadecene |
| | α-Olefin content (U6) | mol % | 73.0 | 17.8 | 10.9 | 3.4 | 10.8 |
| | $[\eta]_C$ | dL/g | 4.4 | 2.5 | 3.5 | 2.9 | 6.4 |
| CFC Data | Presence or absence of a peak of the amount of a component eluted in the range of 100° C. or higher and lower than 140° C. | | Absent | Absent | Absent | Absent | Absent |
| | Presence or absence of a peak of the amount of a component eluted in the range of 0° C. or higher and lower than 100° C. | | Present | Present | Present | Present | Present |
| | Mw/Mn of a component eluted in the range of 0° C. or higher and lower than 100° C. | | 5.6 | 2.6 | 4.1 | 2.6 | 4.5 |

TABLE 2-2

| | | | 4-Methyl-1-pentene copolymer (D) | | | |
|---|---|---|---|---|---|---|
| | | | Production Example 2-5 (D-1) | Production Example 2-6 (D-2) | Production Example 2-7 (D-3) | Production Example 2-8 (D-4) |
| Polymer physical properties | 4-Methyl-1-pentene content(U7) | mol % | 97.0 | 94.0 | 98.9 | 99.5 |
| | α-Olefin type | | Ethylene | 1-Hexene | 1-Decene | 1-Hexadecene 1-Octadecene |
| | α-Olefin content (U8) | mol % | 3.0 | 6.0 | 1.1 | 0.5 |
| | $[\eta]_D$ | dL/g | 2.3 | 2.0 | 1.8 | 1.5 |
| CFC Data | Presence or absence of a peak of the amount of a component eluted in the range of 100° C. or higher and lower than 140° C. | | Present | Present | Present | Present |
| | Presence or absence of a peak of the amount of a component eluted in the range of 0° C. or higher and lower than 100° C. | | Absent | Absent | Absent | Absent |
| | Mw/Mn of a component eluted in the range of 100° C. or higher and lower than 140° C. | | 2.6 | 2.3 | 2.3 | 2.6 |

TABLE 2-3

| | | | Production Example 2-9 (E'-1) | Homopolypropylene F 1 2 3 P (E'-2) | Production Example 2-10 (E'-3) |
|---|---|---|---|---|---|
| Polymer physical properties | 4-Methyl-1-pentene content | mol % | 97.0 | | 74.0 |
| | α-Olefin type | | 1-Hexadecene 1-Octadecene | Propylene | Propylene |
| | α-Olefin content | mol % | 3.0 | 100 | 26.0 |
| | $[\eta]_E$ | dL/g | 2.1 | 2.4 | 1.6 |
| CFC Data | Presence or absence of a peak of the amount of a component eluted in the range of 100° C. or higher and lower than 140° C. | | Present | | Absent |
| | Presence or absence of a peak of the amount of a component eluted in the range of 0° C. or higher and lower than 100° C. | | Present | | Present |
| | Mw/Mn of a component eluted in the range of 100° C. or higher and lower than 140° C. | | 6.0 | | |

TABLE 2-3-continued

|  | Production Example 2-9 (E'-1) | Homopolypropylene F 1 2 3 P (E'-2) | Production Example 2-10 (E'-3) |
|---|---|---|---|
| Mw/Mn of a component eluted in the range of 0° C. or higher and lower than 100° C. | 9.9 |  | 2.4 |

Example 2-1

To 100 parts of the 4-methyl-1-pentene copolymer (C-4), 0.1 parts of n-octadecyl-3-(4'-hydroxy-3',5'-di-t-butylphenyl) propionate as a heat resistant stabilizer, and 0.1 parts of calcium stearate as a hydrochloric acid absorber were mixed in. Then, the resulting compound was granulated under conditions with a set temperature of 270° C. and an amount of the resin extruded of 60 g/min at 200 rpm using a twin-screw extruder BT-30 manufactured by Research Laboratory of Plastics Technology Co., Ltd. (screw diameter: 30 mmφ, L/D=46), thereby obtaining pellets.

The obtained pellets were molded under the film production conditions shown in Table 2-4, thereby obtaining a biaxially stretched film. Specifically, the pellets were supplied to a single-screw extruder, melt-kneaded at 270° C., and then melt-extruded into a film form through a T-type slit die. Next, the obtained film was cooled and solidified while adhered onto a metal cooling roll controlled at 80° C. with air pressure, thereby obtaining an unstretched film having a thickness of 200 µm. The unstretched film thus obtained was preheated with a heated metal roll to increase the film temperature to 190° C., and then it was longitudinally stretched to 3 times the length between a pair of rolls with different peripheral speeds to form a uniaxially stretched film. Then, the uniaxially stretched film was grasped with clips at both ends in the width direction, led to a heating oven, preheated to 190° C., and laterally stretched to 7 times in the width direction to form a biaxially stretched film. Thereafter, the biaxially stretched film was heated to 210° C. and subjected to an annealing treatment. The biaxially stretched film thus obtained was cut at both ends, subjected to a corona discharge treatment, and then wound into a roll shape. The thickness, capacitor properties (dielectric breakdown strength and dielectric tangent), and film properties of the obtained biaxially stretched film were determined by the evaluation methods described below.

Examples 2-2 to 2-6 and Comparative Examples 2-1 and 2-3

Biaxially stretched films were obtained in the same manner as in Example 2-1, except that 100 parts of the polymer components described in Table 2-4 were used instead of 100 parts of the 4-methyl-1-pentene copolymer (C-4) and that the film production was performed under the conditions shown in Table 2-4.

Comparative Example 2-2

Biaxial stretching was attempted in the same manner as in Example 2-1 using the 4-methyl-1-pentene copolymer (E'-1) instead of the 4-methyl-1-pentene copolymer (C-4) under the film production conditions shown in Table 2-4. However, when the longitudinal stretching ratio was 2 times or more, the film broke or the unevenness in film thickness became large, and thus, uniform stretching could not be achieved.

Since the film could not be stretched uniformly as described above, an unstretched film having a thickness of 20 µm was prepared under the film production conditions, and its thickness and capacitor properties (dielectric breakdown strength and dielectric tangent) were determined by the evaluation methods described below.

<Production of Films>

The pellets obtained as described above were melt-cast-molded under conditions involving a cylinder temperature of 270° C., a dice temperature of 270° C., a roll temperature of 80° C., and a take-over speed of 1 m/min using a single-screw sheet molding machine manufactured by Tanaka Iron Works Co., Ltd., thereby obtaining films having a thickness of 100 µm.

<Film Stretchability Evaluation 1 (Batch Stretching)>

The films having a thickness of 100 µm obtained in the <Production of films> were cut into 120 mm×120 mm, and preheated at 160° C. for 1 minute and then subjected to simultaneous biaxial stretching at a stretching speed of 5 m/min using a batch-type biaxial stretching machine manufactured by BRUCKNER Maschinenbau GmbH & Co. KG, thereby obtaining biaxially stretched films. Stretching was performed at a stretching ratio of 2.5×2.5 times (Machine Direction (MD): 2.5 times, and Transverse Direction (TD): 2.5 times), 3.0×3.0 times, 3.5×3.5 times, and 4.0×4.0 times, and evaluation of stretchability was performed based on the state of the films after the stretching as follows.

AA: Stretchable up to 4.0 times×4.0 times
BB: Stretchable up to 3.5 times×3.5 times
CC: Stretchable up to 3.0 times×3.0 times
DD: Stretchable up to 2.5 times×2.5 times
EE: Uniform stretching could not be performed (unstretchable) because of film breakage or large unevenness in film thickness.

[Thickness]

The thickness of the biaxially stretched films or unstretched film was measured using a micrometer. The measurement was carried out at 10 points in the width direction and 10 points in the length direction, and the average value thereof was used as the thickness of the biaxially stretched films or unstretched film.

[Dielectric Breakdown Strength (BDV)]

The dielectric breakdown strength (kV/mm) was measured in accordance with ASTM-D149, using a dielectric breakdown tester manufactured by Yamayoshikenki Co., Ltd. For the biaxially stretched films and unstretched film, the breakdown withstand voltage was measured at 23° C. and 150° C. by applying the voltage at a voltage increase rate of 500 V/sec, and the dielectric breakdown strength at 23° C., V (23° C.), and the dielectric breakdown strength at 150° C., V (150° C.), were determined, and the ratio V (150° C.)/V (23° C.) was calculated.

[Dielectric Tangent (Tan δ)]

Vapor deposition of metallic aluminum and metallic zinc was performed on the biaxially stretched films and unstretched film, using a vacuum vapor deposition machine to form alloy metal vapor-deposited films (aluminum:z- inc=5:95 (mass ratio)) with a film resistance of 18 Ω/sq. At this time, the metals were vapor-deposited in a stripe pattern such that margin sections running in the film longitudinal direction were formed. Next, the surface was slit by inserting a blade in the center of each vapor-deposition section and in the center of each margin section to create a take-up reel in the form of a tape, with the surface having the margin on one side. One tape reel with the margin on the left side and one tape reel with the margin on the right side were overlapped and wound together such that the vapor-deposited parts stuck out beyond the margin parts in the width direction, thereby fabricating capacitor elements.

The capacitor elements were subjected to a press treatment at a temperature of 120° C. and a pressure of 30 kg/cm$^2$ for 6 minutes, followed by attachment of metallikon and lead terminals. These elements were coated with a urethane resin to form capacitors with an electrostatic capacitance of 0.47 μF.

To these capacitors, an AC voltage of 413 V was applied under an atmosphere of 85° C. for a charge time of 1,000 hours, and then the tan δ was measured. The measurement was performed using an LCR meter AG-4311 manufactured by Ando Electric Co., Ltd., under the conditions of 1 V and 1 kHz. The results were evaluated and judged according to the following criteria.

AA: tan δ (150° C.) is 50×10$^{-3}$ or less.
BB: tan δ (150° C.) is more than 50×10$^{-3}$.
AA: tan δ (23° C.) is 400×10$^{-3}$ or less.
BB: tan δ (23° C.) is more than 400×10$^{-3}$.

<Film Stretchability Evaluation 2>
[Film Properties]

In the roll stretching, the lower limit value of film thinning was evaluated as follows.

AA: A thickness of less than 5 μm
BB: A thickness of 5 to 10 μm
CC: A thickness of more than 10 μm, or uniform stretching could not be performed (unstretchable) because of film breakage or large unevenness in film thickness.

The lower limit value of film thinning was calculated by changing the area ratio within the range of a longitudinal stretching ratio of 3.0 to 6.0 and a transverse stretching ratio of 7.0 to 11.0.

Examples 2-1, 2-4, 2-5, 2-6, and Comparative Example 2-3 were stretchable by 5.5 times longitudinally and 11.0 times transversely.

Example 2-3 was stretchable by 4.5 times longitudinally and 11.0 times transversely.

Example 2-2 was stretchable by 3.5 times longitudinally and 9.0 times transversely.

Comparative Example 2-1 was stretchable by 3.0 times longitudinally and 8.0 times transversely.

TABLE 2-4

| | | | Example 2-1 | Example 2-2 | Example 2-3 | Example 2-4 | Example 2-5 | Example 2-6 | Comparative Example 2-1 | Comparative Example 2-2 | Comparative Example 2-3 |
|---|---|---|---|---|---|---|---|---|---|---|---|
| 4-Methyl-1-pentene copolymer (C) | (C-1) | Parts by mass | | | 25 | | | | | | |
| | (C-2) | Parts by mass | | | | 40 | | | | | |
| | (C-3) | Parts by mass | | 30 | | | 40 | | | | |
| | (C-4) | Parts by mass | 100 | | | | | | | | |
| | (C-5) | Parts by mass | | | | | | 35 | | | |
| 4-Methyl-1-pentene copolymer (D) | (D-1) | Parts by mass | | 70 | | | | | | | |
| | (D-2) | Parts by mass | | | 75 | | | | | | |
| | (D-3) | Parts by mass | | | | 60 | | | | | |
| | (D-4) | Parts by mass | | | | | 60 | 65 | 70 | | |
| 4-Methyl-1-pentene copolymer | (E'-1) | Parts by mass | | | | | | | | 100 | |
| Homopolypropylene | (E'-2) | Parts by mass | | | | | | | | | 100 |
| 4-Methyl-1-pentene copolymer | (E'-3) | Parts by mass | | | | | | | 30 | | |
| | U6/U8 | | | 3.6 | 12.2 | 16.2 | 21.8 | 21.6 | | | |
| Stretching evaluation 1 (batch stretching) | Stretchability | | AA | BB | AA | AA | AA | AA | CC | EE | AA |
| | Lower limit value of film thinning | μm | 5 | 8 | 6 | 5 | 5 | 5 | 10 | | 5 |
| Film production conditions (roll stretching) | Cylinder temperature | ° C. | 270 | 270 | 270 | 270 | 270 | 270 | 270 | 270 | 230 |
| | Cooling roll temperature | ° C. | 80 | 80 | 80 | 80 | 80 | 80 | 80 | 80 | 30 |
| | Longitudinal stretching temperature | ° C. | 190 | 160 | 160 | 160 | 160 | 160 | 160 | 190 | 150 |

TABLE 2-4-continued

|  |  | Example 2-1 | Example 2-2 | Example 2-3 | Example 2-4 | Example 2-5 | Example 2-6 | Comparative Example 2-1 | Comparative Example 2-2 | Comparative Example 2-3 |
|---|---|---|---|---|---|---|---|---|---|---|
| Transverse stretching temperature | °C. | 190 | 160 | 160 | 160 | 160 | 160 | 160 | 190 | 150 |
| Annealing temperature | °C. | 210 | 210 | 210 | 210 | 210 | 210 | 210 | 210 | 155 |

TABLE 2-5

|  | Stretching ratio (MD × TD) | Film thickness (μm) | Capacitor properties | | | | | | | Film properties |
|---|---|---|---|---|---|---|---|---|---|---|
|  |  |  | V (150° C.) (kV/mm) | V (23° C.) (kV/mm) | Ratio V (150° C.)/V (23° C.) | tanδ (150° C.) [10-5] ≤50 | Measured value | tanδ (23° C.) [10-5] ≤400 | Measured value | Ratio tanδ (150° C.)/ tanδ (23° C.) | Stretching evaluation 2 (roll stretching) Lower limit value of film thinning |
| Example 2-1 | 3 × 7 | 10 | 430 | 642 | 0.67 | AA | 24 | AA | 320 | 0.08 | AA (3 μm) |
| Example 2-2 | 3 × 7 | 10 | 340 | 580 | 0.59 | AA | 18 | AA | 280 | 0.06 | BB (6 μm) |
| Example 2-3 | 3 × 7 | 10 | 366 | 587 | 0.62 | AA | 15 | AA | 240 | 0.06 | AA (4 μm) |
| Example 2-4 | 3 × 7 | 10 | 382 | 595 | 0.64 | AA | 15 | AA | 230 | 0.07 | AA (3 μm) |
| Example 2-5 | 3 × 7 | 10 | 398 | 612 | 0.65 | AA | 10 | AA | 200 | 0.05 | AA (3 μm) |
| Example 2-6 | 3 × 7 | 10 | 399 | 615 | 0.65 | AA | 13 | AA | 220 | 0.06 | AA (3 μm) |
| Comparative Example 2-1 | 3 × 7 | 10 | 255 | 583 | 0.44 | AA | 21 | AA | 260 | 0.08 | BB (8 μm) |
| Comparative Example 2-2 | Unstretchable | 20 | 180 | 300 | 0.60 | AA | 9 | AA | 190 | 0.05 | CC (Unstretchable) |
| Comparative Example 2-3 | 3 × 7 | 10 | Unmeasurable | 660 |  | BB | 80 | BB | 420 | 0.19 | AA (3 μm) |

The invention claimed is:

1. A resin composition comprising a 4-methyl-1-pentene copolymer (A) that satisfies the following requirements (A-a) to (A-d) and a 4-methyl-1-pentene copolymer (B) that satisfies the following requirements (B-a), (B-a1), (B-b), (B-b1), and (B-c) to (B-d),
wherein a content of the copolymer (A) is 10 to 95 parts by mass and a content of the copolymer (B) is 90 to 5 parts by mass with respect to 100 parts by mass of the total content of the copolymers (A) and (B):
(A-a) an amount (U1) of constitutional units derived from 4-methyl-1-pentene is 80.0 to 99.9% by mol and a total amount (U2) of constitutional units derived from at least one selected from linear α-olefins having 2 to 20 carbon atoms is 20.0 to 0.1% by mol with respect to 100% by mol of the total amount of U1 and U2;
(A-b) an intrinsic viscosity [η]A measured in decalin of 135° C. is 0.5 to 5.0 dL/g;
(A-c) when the copolymer (A) is measured in a cross fractionation chromatograph apparatus (CFC) using an infrared spectrophotometer as a detector part, at least one peak of an amount of a component eluted is present in a range of 100 to 140° C.;
(A-d) when the copolymer (A) is measured in the CFC, a molecular weight distribution (Mw/Mn), which is a ratio between a weight average molecular weight (Mw) and a number average molecular weight (Mn), in the component eluted in a range of 100 to 140° C., is 1.0 to 3.5;
(B-a) an amount (U3) of constitutional units derived from 4-methyl-1-pentene is 20.0 to 98.0% by mol and a total amount (U4) of constitutional units derived from at least one selected from linear α-olefins having 2 to 20 carbon atoms is 80.0 to 2.0% by mol with respect to 100% by mol of the total amount of U3 and U4;
(B-a1) a ratio (U4/U2) between U2 (% by mol) described in the requirement (A-a) and U4 (% by mol) described in the requirement (B-a) is more than 1.0 and less than 50.0;
(B-b) an intrinsic viscosity [η]B measured in decalin of 135° C. is 2.0 to 8.0 dL/g;

(B-b1) a ratio ([η]B/[η]A) between [η]A described in the requirement (A-b) and [η]B described in the requirement (B-b) is more than 1.0 and 6.0 or less;

(B-c) when the copolymer (B) is measured in a cross fractionation chromatograph apparatus (CFC) using an infrared spectrophotometer as a detector part, at least one peak of an amount of a component eluted is present in a range of 0° C. or higher and lower than 100° C.; and (B-d) when the copolymer (B) is measured in the CFC, a molecular weight distribution (Mw/Mn), which is a ratio between a weight average molecular weight (Mw) and a number average molecular weight (Mn), in the component eluted in a range of 0° ° C. or higher and lower than 100° C. is 1.0 to 7.0.

2. The resin composition according to claim 1, wherein the linear α-olefins in the copolymers (A) and (B) are each independently a linear α-olefin having 5 to 20 carbon atoms.

3. The resin composition according to claim 1, wherein the linear α-olefins in the copolymers (A) and (B) are each independently at least one selected from 1-hexene, 1-octene, 1-decene, 1-tetradecene, 1-hexadecene, and 1-octadecene.

4. The resin composition according to claim 1, wherein the content of the copolymer (A) is 15 to 90 parts by mass and the content of the copolymer (B) is 85 to 10 parts by mass with respect to 100 parts by mass of the total content of the copolymers (A) and (B).

5. The resin composition according to claim 1, wherein, when measured in a cross fractionation chromatograph (CFC) using an infrared spectrophotometer as a detector part, an amount of a component eluted in a range of 135° C. or higher is 20% by mass or less relative to the entire amount of a component eluted in a range of 0 to 145° C. of the resin composition.

6. A molded article comprising the resin composition according to claim 1.

7. A film comprising the resin composition according to claim 1.

8. The film according to claim 7, wherein the film is a film for capacitors.

9. A film for capacitors, obtained by subjecting a film composed of a composition X comprising 90 to 5 parts by mass of a 4-methyl-1-pentene copolymer (C) that satisfies the following requirements (C-a) to (C-d) and 10 to 95 parts by mass of a 4-methyl-1-pentene copolymer (D) that satisfies the following requirements (D-a) to (D-d) and (D-a1) with respect to 100 parts by mass of the total content of the copolymers (C) and (D) to biaxial stretching:

(C-a) an amount (U5) of constitutional units derived from 4-methyl-1-pentene is 20.0 to 98.0% by mol and an amount (U6) of constitutional units derived from an α-olefin having 5 to 20 carbon atoms other than 4-methyl-1-pentene is 80.0 to 2.0% by mol;

(C-b) an intrinsic viscosity [η]C measured in decalin of 135° C. is 1.5 to 8.0 dL/g;

(C-c) when the copolymer (C) is measured in a cross fractionation chromatograph apparatus (CFC) using an infrared spectrophotometer as a detector part, at least one peak of an amount of a component eluted is present in a range of 0° C. or higher and lower than 100° C.;

(C-d) when the copolymer (C) is measured in the CFC, a molecular weight distribution (Mw/Mn), which is a ratio between a weight average molecular weight (Mw) and a number average molecular weight (Mn), in the component eluted in a range of 0° ° C. or higher and lower than 100° C. is 1.0 to 7.0;

(D-a) an amount (U7) of constitutional units derived from 4-methyl-1-pentene is 80.0 to 99.9% by mol and an amount (U8) of constitutional units derived from an α-olefin having 2 to 20 carbon atoms other than 4-methyl-1-pentene is 20.0 to 0.1% by mol;

(D-b) an intrinsic viscosity [η]D measured in decalin of 135° C. is 0.5 to 5.0 dL/g;

(D-c) when the copolymer (D) is measured in a cross fractionation chromatograph apparatus (CFC) using an infrared spectrophotometer as a detector part, at least one peak of an amount of a component eluted is present in a range of 100° C. or higher and lower than 140° C.;

(D-d) when the copolymer (D) is measured in the CFC, a molecular weight distribution (Mw/Mn), which is a ratio between a weight average molecular weight (Mw) and a number average molecular weight (Mn), in the component eluted in a range of 100° C. or higher and lower than 140° C. is 1.0 to 3.5; and (D-a1) a ratio (U6/U8) between U6 (% by mol) described in the requirement (C-a) and U8(% by mol) described in the requirement (D-a) is more than 1.0 and less than 50.0.

10. The film for capacitors according to claim 9, wherein the α-olefin in the copolymer (D) is an α-olefin having 5 to 20 carbon atoms other than 4-methyl-1-pentene.

11. The film for capacitors according to claim 9, wherein the α-olefins in the copolymers (C) and (D) are each independently an α-olefin having 10 to 20 carbon atoms.

12. The film for capacitors according to claim 9, having a ratio V (150° C.)/V)(23° ° C. between a dielectric breakdown strength at 23° C., V (23° C.), and a dielectric breakdown strength at 150° ° C., V (150° C.), of 0.50 or more.

13. The film for capacitors according to claim 9, having: a dielectric tangent at 23° C., tan δ (23° C.), of $400 \times 10^{-5}$ or less;
a dielectric tangent at 150° C., tan δ (150° C.), of $50 \times 10^{-5}$ or less; and
a ratio tan δ (150° C.)/tan δ (23° C.) between tan δ (23° C.) and tan δ (150° C.) of 0.10 or less.

14. The film for capacitors according to claim 9, having a stretching ratio of 1.1 to 100 times in terms of area.

15. The film for capacitors according to claim 9, having a thickness of 1 to 20 μm.

16. A metallized film having the film for capacitors according to claim 9 and a metal film provided on at least one face of the film.

17. A film capacitor having the metallized film according to claim 16.

* * * * *